(12) United States Patent
Chen et al.

(10) Patent No.: US 12,177,718 B2
(45) Date of Patent: Dec. 24, 2024

(54) TECHNIQUES FOR ADAPTIVE BITRATE VIDEO TRAFFIC SHAPING

(71) Applicant: Telefonaktiebolaget LM Ericsson (publ), Stockholm (SE)

(72) Inventors: Deyang Chen, Guangdong (CN); Marcus Ihlar, Aelvsjoe (SE); Robert Skog, Haesselby (SE); Ruizhao Wu, Guangdong (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 420 days.

(21) Appl. No.: 17/630,697

(22) PCT Filed: Aug. 14, 2019

(86) PCT No.: PCT/CN2019/100566
§ 371 (c)(1),
(2) Date: Jan. 27, 2022

(87) PCT Pub. No.: WO2021/026808
PCT Pub. Date: Feb. 18, 2021

(65) Prior Publication Data
US 2022/0264360 A1 Aug. 18, 2022

(51) Int. Cl.
*H04W 28/02* (2009.01)
*H04L 47/22* (2022.01)

(52) U.S. Cl.
CPC ... *H04W 28/0273* (2013.01); *H04W 28/0236* (2013.01); *H04W 28/0289* (2013.01); *H04L 47/22* (2013.01)

(58) Field of Classification Search
CPC . H04W 28/00; H04W 28/02; H04W 28/0273; H04W 28/0231; H04W 28/0236;
(Continued)

(56) References Cited

U.S. PATENT DOCUMENTS

2012/0163203 A1* 6/2012 Wilkinson ............. H04L 47/38
370/252
2014/0019590 A1* 1/2014 Piernot ................ H04L 67/565
709/217
(Continued)

FOREIGN PATENT DOCUMENTS

CN 108028830 A 5/2018
CN 108292987 A 7/2018
(Continued)

OTHER PUBLICATIONS

EPO Communication with Supplementary European Search Report dated Mar. 24, 2023 for Patent Application No. 19941672.8, consisting of 10-pages.
(Continued)

*Primary Examiner* — Warner Wong
(74) *Attorney, Agent, or Firm* — Weisberg I.P. Law, P.A.

(57) ABSTRACT

The present disclosure relates to techniques for shaping video data traffic in a packet switched communications transport network. In some embodiments, a device determines a cell load level associated with a base station node that is representative of a data traffic load of a cell of the base station node. The device sets, based at least on the determined cell load level associated with the base station, one or more burst transmission parameters for video data transmitted by a traffic shaping node to the base station node. The device transmits video data to the base station node using the set one or more burst transmission parameters, wherein transmitting video data occurs in one or more burst transmissions that each include a plurality of packets that include video data.

23 Claims, 16 Drawing Sheets

(58) Field of Classification Search
CPC ............. H04W 28/08; H04W 28/0808; H04W 28/0284; H04W 28/0289; H04W 28/0268; H04W 28/10; H04W 28/12; H04W 28/16; H04W 28/18; H04L 2012/5678; H04L 2012/568; H04L 47/22
See application file for complete search history.

(56) References Cited

U.S. PATENT DOCUMENTS

| | | | | |
|---|---|---|---|---|
| 2014/0112172 | A1* | 4/2014 | Vangala | H04L 43/10 370/252 |
| 2015/0257035 | A1* | 9/2015 | Grinshpun | H04W 28/0284 370/235 |
| 2018/0098256 | A1* | 4/2018 | Halepovic | H04W 24/08 |
| 2019/0007873 | A1* | 1/2019 | Kumar Parameswarn Rajamma | H04W 36/36 |
| 2020/0359256 | A1* | 11/2020 | Liu | H04W 40/023 |

FOREIGN PATENT DOCUMENTS

| | | | | |
|---|---|---|---|---|
| EP | 3350972 | B1 | 7/2019 | |
| WO | WO-2014209493 | A1 * | 12/2014 | ........... H04L 65/605 |
| WO | WO-2014209494 | A1 * | 12/2014 | ......... H04L 47/2416 |
| WO | 2018136132 | A1 | 7/2018 | |

OTHER PUBLICATIONS

International Search Report and Written Opinion dated May 11, 2020 for International Application No. PCT/CN2019/100566 filed Aug. 14, 2019, consisting of 8-pages.

3GPP TR 32.450 V15.1.0; 3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 15), Dec. 2018, consisting of 17-pages.

3GPP TR 25.701 V12.2.0; 3rd Generation Partnership Project; Technical Specification Group Radio Access Network; Study on scalable UMTS Frequency Division Duplex (FDD) bandwidth (Release 12), Jun. 2014, consisting of 207-pages.

* cited by examiner

| Interval | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| Max Value of Lowest 10% RTT Samples | 110 | 130 | 160 | 130 | 160 | 170 | 155 | 120 | 90 | 110 | 90 | 120 | 140 | 160 | 170 | 160 | 90 | 80 | 80 | 80 | 60 | 30 |
| Interval Load Level | 2 | 2 | 3 | 2 | 3 | 3 | 3 | 2 | 1 | 2 | 1 | 2 | 2 | 3 | 3 | 3 | 1 | 1 | 1 | 1 | 1 | 1 |
| Cell Load Level | 1 | | 2 | | | 3 | | | 2 | | | 3 | | | | | | | | | | 1 |

*FIG. 11*

TECHNIQUES FOR ADAPTIVE BITRATE VIDEO TRAFFIC SHAPING

CROSS-REFERENCE TO RELATED APPLICATIONS

This application is a Submission Under 35 U.S.C. § 371 for U.S. National Stage Patent Application of International Application Number: PCT/CN2019/100566, filed Aug. 14, 2019 entitled "TECHNIQUES FOR ADAPTIVE BITRATE VIDEO TRAFFIC SHAPING," the entirety of which is incorporated herein by reference.

TECHNICAL FIELD

This application relates to shaping data traffic in a telecommunication network, and in particular to shaping video data traffic.

BACKGROUND

ABR Video Traffic Shaping

Modern video clients dynamically adapt the playback quality based on estimates of available bandwidth. This technique is known as Adaptive Bitrate (ABR) delivery. It works by having a video file segmented into several small files. Multiple copies of each video segment, encoded in different resolutions, are stored at a server. Clients continuously request new video segments and select the optimal quality based on the download time of the previous request. ABR technologies have been crucial to deliver video over wireless networks where capacity and network quality often fluctuates.

ABR video traffic is the main source of volume in mobile broadband networks, and the trends indicate that the video volume will continue to increase over time. This has been challenging to operators from two perspectives, the increased video volume puts requirements on costly capacity upgrades and increased video consumption quickly drains end-user's allocated amount of data (e.g., for a monthly period).

As a response to the challenge of increased video traffic, operators deploy solutions that intend to reduce the volume consumed by video services. A common method of reducing video volume is ABR shaping. ABR shaping takes advantage of the fact that ABR video clients can measure download bitrates to determine the optimal video resolution. An ABR shaper detects video flows that traverse the network it is deployed in and applies traffic shaping for those flows. The shaper is typically statically configured to enforce a bitrate that ensures that the client does not select video segments above some quality level (resolution).

Downlink Key Performance Indicator: IP Throughput in DL

Increasingly, video data is being transmitted over wireless telecommunication networks (e.g., cellular networks). One or more key performance indicators (KPIs) can provide information about the performance of a radio access network (RAN) cell. For example, a measurement of downlink throughput for a RAN cell (e.g., from the RAN to user equipment (UE)) is provided in 3GPP TS 32.450. The relevant portion of 3GPP TS 32.450 describes how to calculate the KPI "IP Throughput in DL". This KPI is calculated by measuring the number, and size of, transmissions it takes to empty an eNodeB (eNB) buffer. The sum of the volume of the transmissions is divided by the time from the first to the last transmission. An important detail is that the last data unit transmission time interval (TTI), which results in the eNB buffer becoming empty, is excluded from the calculation.

FIG. 1 illustrates a diagram 100 explaining an exemplary calculation of IP Throughput in DL in accordance with 3GPP TS 32.450. Diagram 100 includes multiple TTI blocks (along the horizontal time axis, in units of milliseconds), each representing one of four exemplary states: successful transmission, buffer not empty; failed transmission ("block error"); successful transmission, buffer empty; and no transmission, buffer not empty (e.g., due to contention). IP Throughput in DL is equal to:

$$\text{IP Throughput in } DL = \frac{ThpVolDl}{ThpTimeD} \text{ where}$$

$$ThpVolDl = \sum [\text{Size of block with successful transmission, buffer not empty}]$$

Notably, ThpVolDl excludes the final TTI data unit of successful transmission that results in the buffer being emptied, block 104 in this example. Notably, ThpTimeDl (e.g., 102) excludes the TTI of the final TTI data unit (e.g., block 104) as well. ThpVolDl will have units, for example, in kilobits, and ThpTimeDl (e.g., 102) will have units, for example, in milliseconds.

There currently exist certain challenges associated with the use of ABR shaping in cellular networks, including KPI degradation and increased latency for non-video traffic, described below.

Shaping Causes IP Throughput in DL KPI Degradation

Low throughput shaping, such as ABR shaping traffic, typically has the effect that equally-sized packets (e.g., single TCP/IP packets) reach a RAN (e.g., eNB) at equally-spaced intervals (e.g., one packet every 8 milliseconds). This leads to an increased number of single-TTI transmissions for high throughput users in RAN (e.g., UEs capable of high throughput communication with the RAN) because the high throughput capability (e.g., between a UE and the RAN) can allow a single TTI to be sufficient to transmit the single TCP/IP packet. An increased number of single-TTI transmissions can cause a degradation of the IP Throughput in DL KPI where the last TTI is excluded from the calculation. The degradation occurs because single-TTI transmissions of high throughput users are excluded from the calculation, while low throughput users where more than a single TTI is required to deliver a single packet still get included in the KPI.

FIG. 2 depicts an illustrative example of IP Throughput in DL degradation in diagram 200. In this example, assume a MBR (Maximum Bitrate) is set to 1.5 Mbps in a shaper (which shapes the traffic), and the size of one packet is 1500 Bytes. A 1.5 Mbps bitrate is roughly 1 packet every 8 ms. The application layer MBR of 1.5 Mbps is respected by the shaper—as can be seen, 1500 bytes are sent every 8 ms. Video bitrate=(1.5 (kBytes)*8 (kbits/kByte)/1 ms=1.5 Mbps (Megabits/s). However, as can be seen, because the video packets each fit within one TTI, they are each excluded from calculation of IP Throughput in DL.

FIG. 3 also depicts an illustrative example of IP Throughput in DL degradation in diagram 300. In this example, assume a MBR (Maximum Bitrate) is set to 1.5 Mbps in a shaper (which shapes the traffic), and the size of one packet is 1500 Bytes. A 1.5 Mbps bitrate is roughly 1 packet every 8 ms. The application layer MBR of 1.5 Mbps is respected by the shaper—as can be seen, 1500 bytes are sent every 8 ms. Video bitrate=(1.5 (kBytes)*8 (kbits/kByte)/1 ms=1.5 Mbps (Megabits/s). However, as can be seen in FIG. 3, one packet is delivered over two TTIs, packet 304a (1000 Bytes) and packet 304b (500 Bytes). In this example, packet 304a would be used to calculate IP Throughput in DL. Here, ThpVoIDl=1000 Bytes=8 kbits. Accordingly, IP Throughput in DL=8 kbits/1 ms=8 Mbits/s.

Video Traffic Causes Increased Latency for Non-Video

In a highly loaded (a condition also referred to as congested) cell, of a base station (e.g., eNB) there will be contention for downlink transmission resources (e.g., radio resources). Scheduler resource contention is noticeable to end-users as increased delay. Video streaming flows, even when shaped to some maximum bitrate (MBR), consume a relatively large portion of available resources and therefore causes a degraded quality of experience (QoE) for latency sensitive applications such as browsing or over-the-top (OTT) voice over internet protocol (VoIP) calls.

ABR shapers are typically implemented in a packet gateway or as an SGi Local Area Network (SGi-LAN) function (e.g., as part of a traffic detection function), so information regarding cell load condition is not readily available.

SUMMARY

Due to the way IP Throughput in DL is determined—to exclude the final TTI data unit—the best signal moments are excluded when calculating KPI, yet the worse signal moments are included. In other words, when throughput is good and a block of data can be transmitted within one TTI, such data is excluded from KPI while taking up an entire TTI. For example, where real throughput could be more than 100 Mbps, the radio KPI of IP Throughput in DL is 8 Mbps in the example in FIG. 1.

Certain aspects of the present disclosure and their embodiments may provide solutions to these or other challenges. Described herein are improvements in ABR shaping techniques that, for example, can reduce the negative impact on throughput KPIs and be adaptive to the cell load-level in the network. Furthermore, described herein are techniques for estimating cell load based, for example, on TCP/IP metrics.

There are, proposed herein, various embodiments which address one or more of the issues disclosed herein.

In some embodiments, a method for shaping video data traffic in a packet switched communications transport network, comprises: determining a cell load level associated with a base station node that is representative of a data traffic load of a cell of the base station node; setting, based at least on the determined cell load level associated with the base station, one or more burst transmission parameters for video data transmitted by a traffic shaping node to the base station node; and transmitting video data to the base station node using the set one or more burst transmission parameters, wherein transmitting video data occurs in one or more burst transmissions that each include a plurality of packets that include video data.

In some embodiments, a traffic shaping node device for shaping video data traffic in a packet switched communications transport network comprises one or more processor and memory, said memory containing instructions executable by said one or more processors, said instructions including instructions for: determining a cell load level associated with a base station node that is representative of a data traffic load of a cell of the base station node; setting, based at least on the determined cell load level associated with the base station, one or more burst transmission parameters for video data transmitted by the traffic shaping node device to the base station node; and transmitting video data to the base station node using the set one or more burst transmission parameters, wherein transmitting video data occurs in one or more burst transmissions that each include a plurality of packets that include video data.

In some embodiments, a computer-readable storage medium stores instructions for shaping video data traffic in a packet switched communications transport network, wherein said instructions are executable by a device having one or more processors and memory, said instructions including instructions for: determining a cell load level associated with a base station node that is representative of a data traffic load of a cell of the base station node; setting, based at least on the determined cell load level associated with the base station, one or more burst transmission parameters for video data transmitted by a traffic shaping node to the base station node; and transmitting video data to the base station node using the set one or more burst transmission parameters, wherein transmitting video data occurs in one or more burst transmissions that each include a plurality of packets that include video data.

Certain embodiments may provide one or more of the following technical advantages. ABR shaping in accordance with the techniques described herein can cause less degradation of throughput KPI and be more adaptive to the actual load conditions in the network.

BRIEF DESCRIPTION OF THE DRAWINGS

FIG. 11 illustrates an exemplary correspondence between RTT samples, interval load levels, and cell load level over time in accordance with some embodiments.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The two problems described above (ABR shaping causing IP Throughput in DL KPI degradation, and video traffic causing increased latency for non-video traffic) can be mitigated by adapting the way a shaper is transmitting data based on the level of cell load. As will be described in more detail below, transmitting video data in bursts can reduce the negative impact on throughout KPI, and transmitting video data at a lower maximum bitrate and smaller burst size can reduce the latency of non-video traffic. Cell load can be used to change a bursting mode (e.g., changing parameters of burst transmission), and to enforce a maximum bitrate of video passing through the network. Cell load can be approximated at the ABR shaper based on characteristics of communication between the ABR shaper and user equipment (UE) connected via the cell and corresponding base station node (e.g., "eNodeB", also referred to herein as "eNB"). The techniques below can be combined to create a shaper that is both capable of detecting high cell load and adapting its behavior accordingly.

Described below are various techniques related to shaping traffic using a bursting mode to get correct radio KPI IP Throughput in DL, adapting burst size used in shaping based on cell load level, setting a maximum bitrate used in shaping traffic based on cell load level, and detecting cell load level based on round trip time of communication between a shaper and a base station (e.g., a cell of the base station).

A. Customizing Burst Transmission of Video Data

1. Transmitting Data in Bursts

Instead of equally pacing the packets (e.g., sending one packet at a time separated by equal intervals of time), an ABR shaper can send the packets in bursts. For example, a shaper with a configured MBR transmits 15 packets (e.g., burstSize is 15 packets in length) in a batch every 120 ms (e.g., burstInterval is 120 ms), instead of evenly spacing single packet transmission every 8 ms. The burstInterval can be calculated as burstSize divided by MBR.

Figure 1:
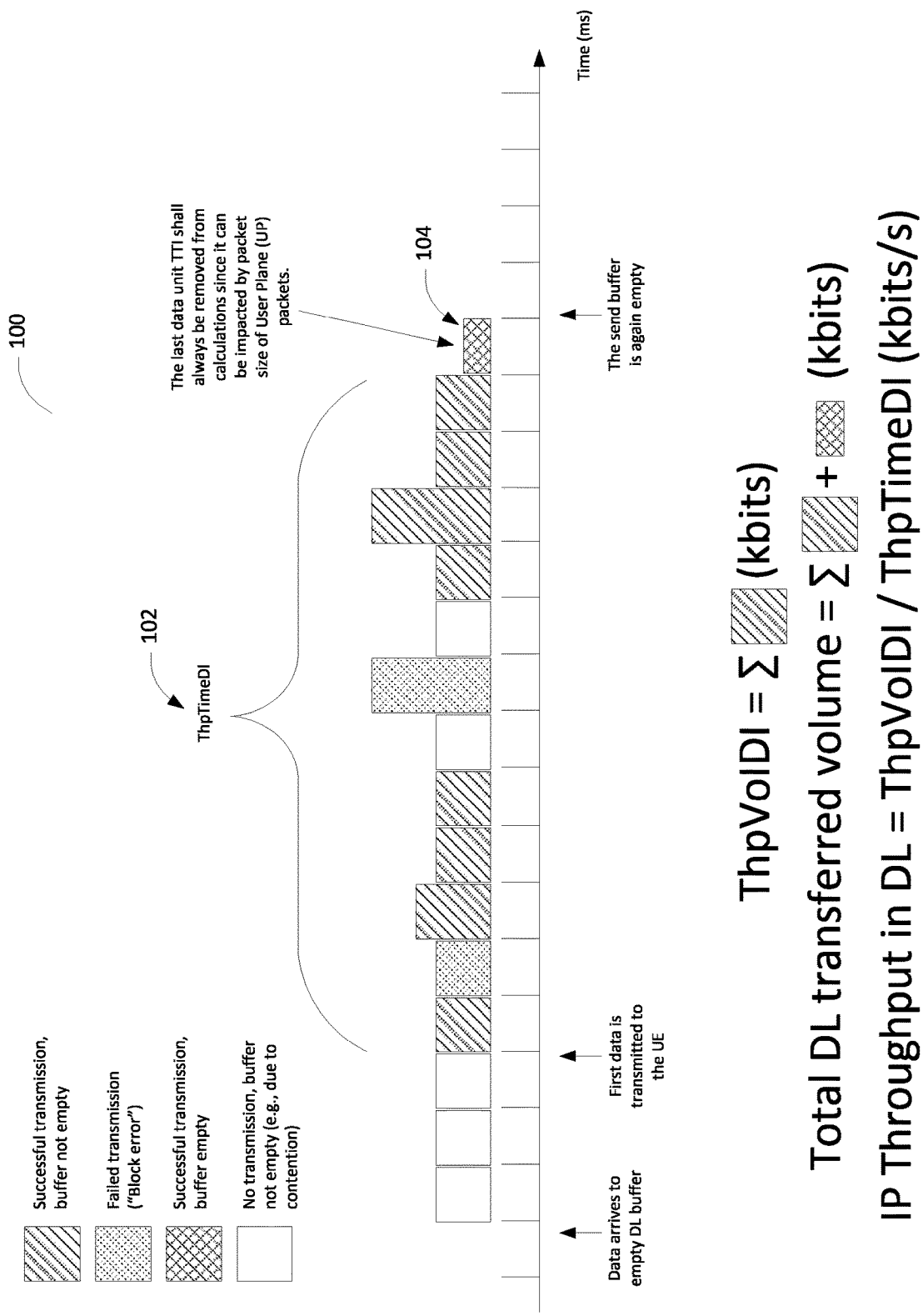
FIG. 1 illustrates an exemplary data flow through a base station buffer.
Figure 2:
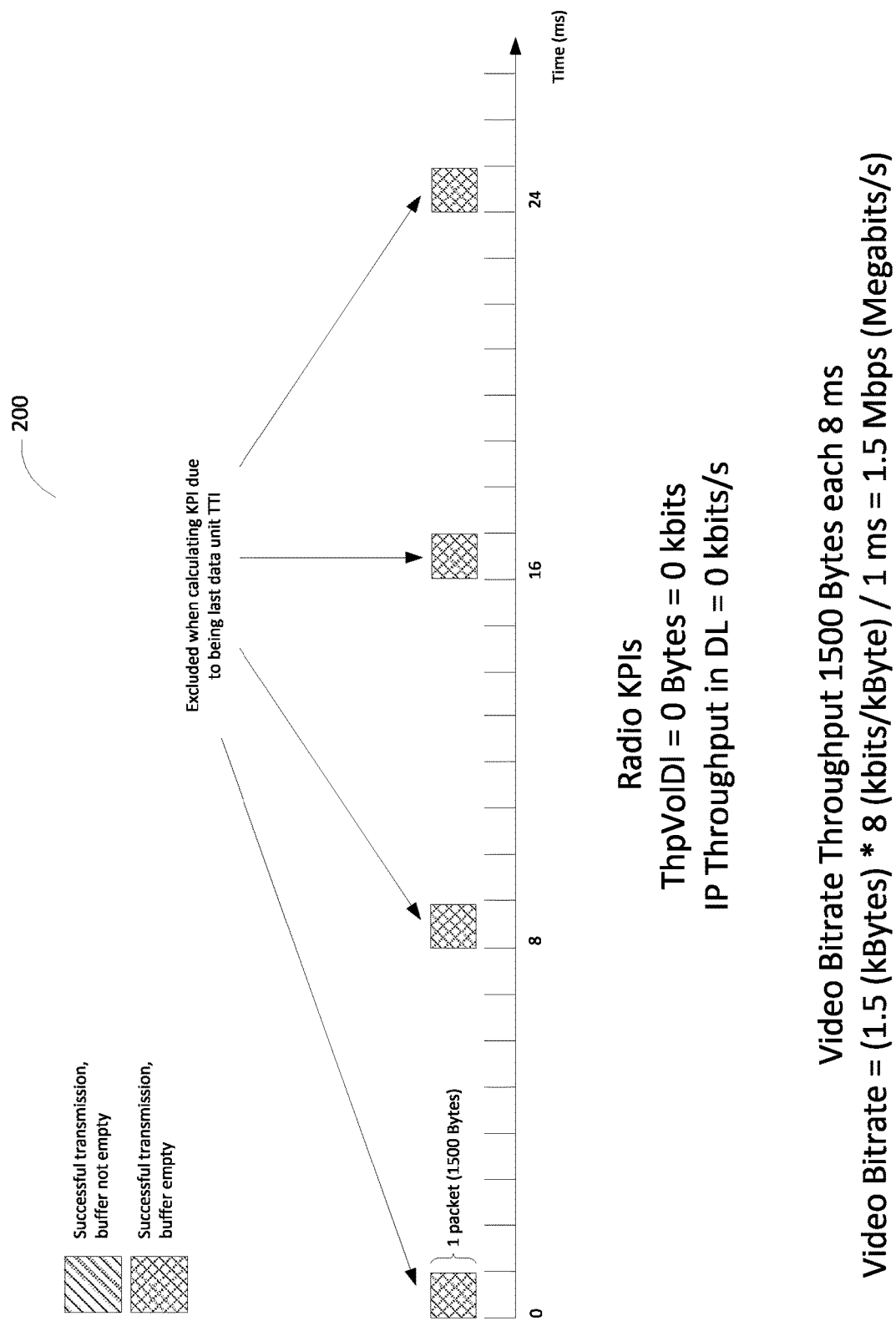
FIG. 2 illustrates an exemplary data flow through a base station buffer.
Figure 3:
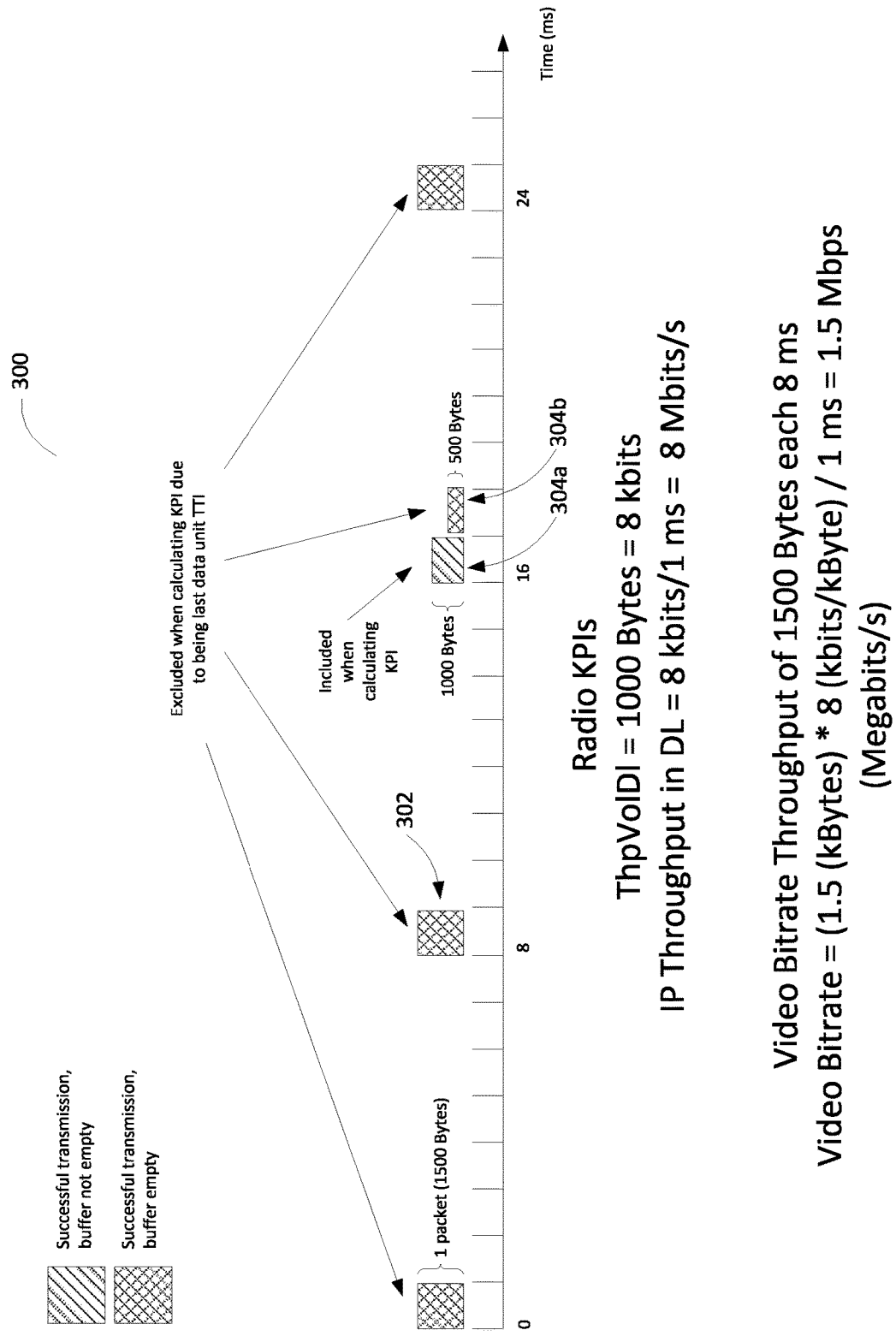
FIG. 3 illustrates an exemplary data flow through a base station buffer.
Figure 4:
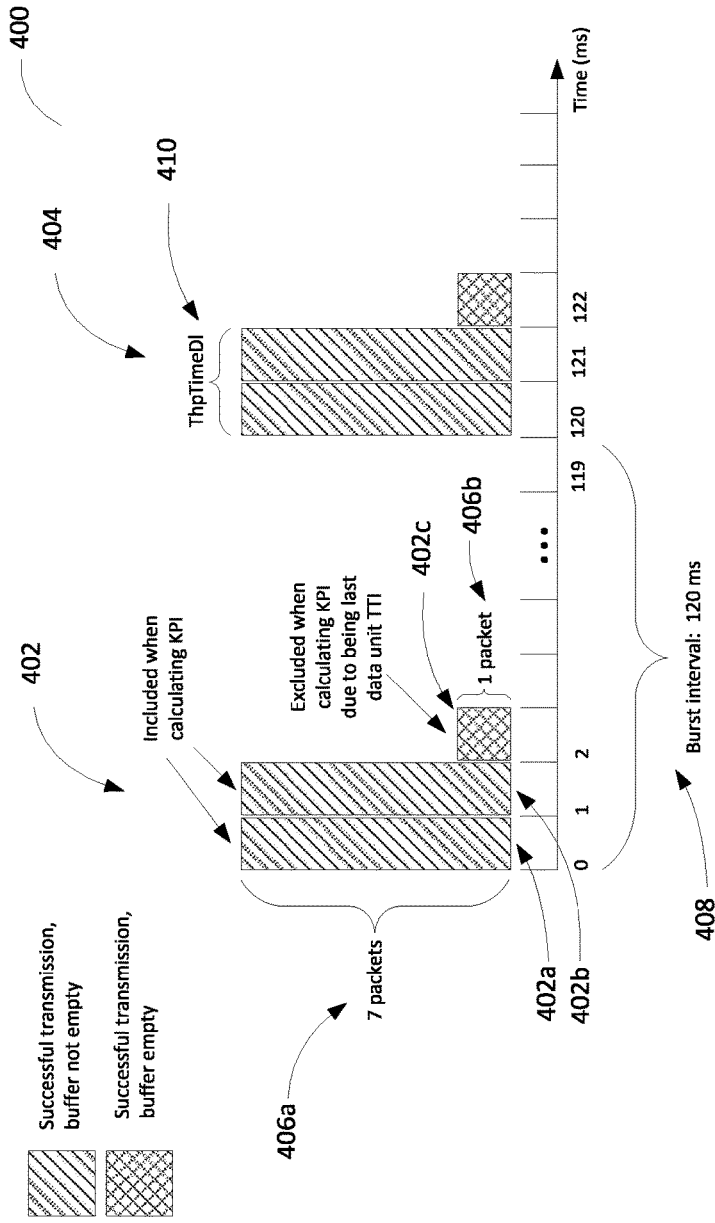
FIG. 4 illustrates an exemplary data flow through a base station buffer in accordance with some embodiments.

FIG. 4 illustrates exemplary burst transmission of data packets. In the example in FIG. 4, a RAN cell is under a low/no load condition, and thus there is not much contention for downlink transmission resources. In the example in FIG. 4, an exemplary burst transmission (e.g., 402, 404) includes 15 packets (burstSize), which is transmitted in three TTIs every 120 ms (burstInterval). The first and second TTI each transmits 7 packets (indicated by 406a), and the third TTI transmits only 1 packet (indicated by 406b). Block 402a and block 402b each include 7 packets, and block 402c includes 1 packet. The burst transmissions 402 and 404 have a ThpTimeDl of 2 ms (two TTIs) (as indicated by 410) and a burstInterval of 120 ms (as indicated by 408). The application layer MBR of 1.5 Mbps is respected (e.g., 15 packets at 1500 Bytes every 120 ms is 1.5 Mbps). The resulting radio KPI of IP Throughput in DL is 84 Mbps, as shown below.

ThpVoIDl=2*7 (packets)*1.5 (kBytes)*8 (kbits/kByte)=168 kbits

ThpTimeDl=2 ms

IP Throughput in DL=168 kbits/2 ms=84 Mbits/s

Note that the burst transmission in FIG. 4 is merely an example, and that other parameters can be used. For example, 15 packets can be divided between any number of TTIs depending on cell condition (e.g., throughput, load). For instance, the 15 packets can be split between 4 different TTIs as follows: 4 packets, 4 packets, 4 packets, and 3 packets. When the cell is in good condition, the shaper can transmit more packets (e.g., 7) in a TTI (an exemplary large throughput). When the cell is not capable of a high throughput (e.g., is experiencing load, is experiencing poorer radio connection to a UE), it will be capable of transmitting a lower number of packets (e.g., 4) in a TTI (an exemplary medium throughput). Based on the equation for IP Throughput in DL described above, the IP Throughput in DL will be lower in the case where more TTIs are used to transmit the 15 packets (ThpTimeDl will increase due to the use of three total TTIs (the final TTI is not included); ThpVoIDl will decrease due to three packets from the final TTI being excluded from the calculation (rather than one being dropped in the 7-7-1 packet split scenario)). As will be shown below with respect to FIG. 5, scheduler contention can also cause IP Throughput in DL to be reduced (e.g., due to an increase in ThpTimeDl).

The data transmitted in the last TTI (meaning that eNB buffer becomes empty after this TTI's transmission) are excluded from the KPI calculation. If the eNB buffer is not empty after a TTI, then this is not the last TTI and the data transmitted in this TTI are included in KPI calculation. This is the case no matter how many data packets are transmitted in the last TTI.

Figure 5:
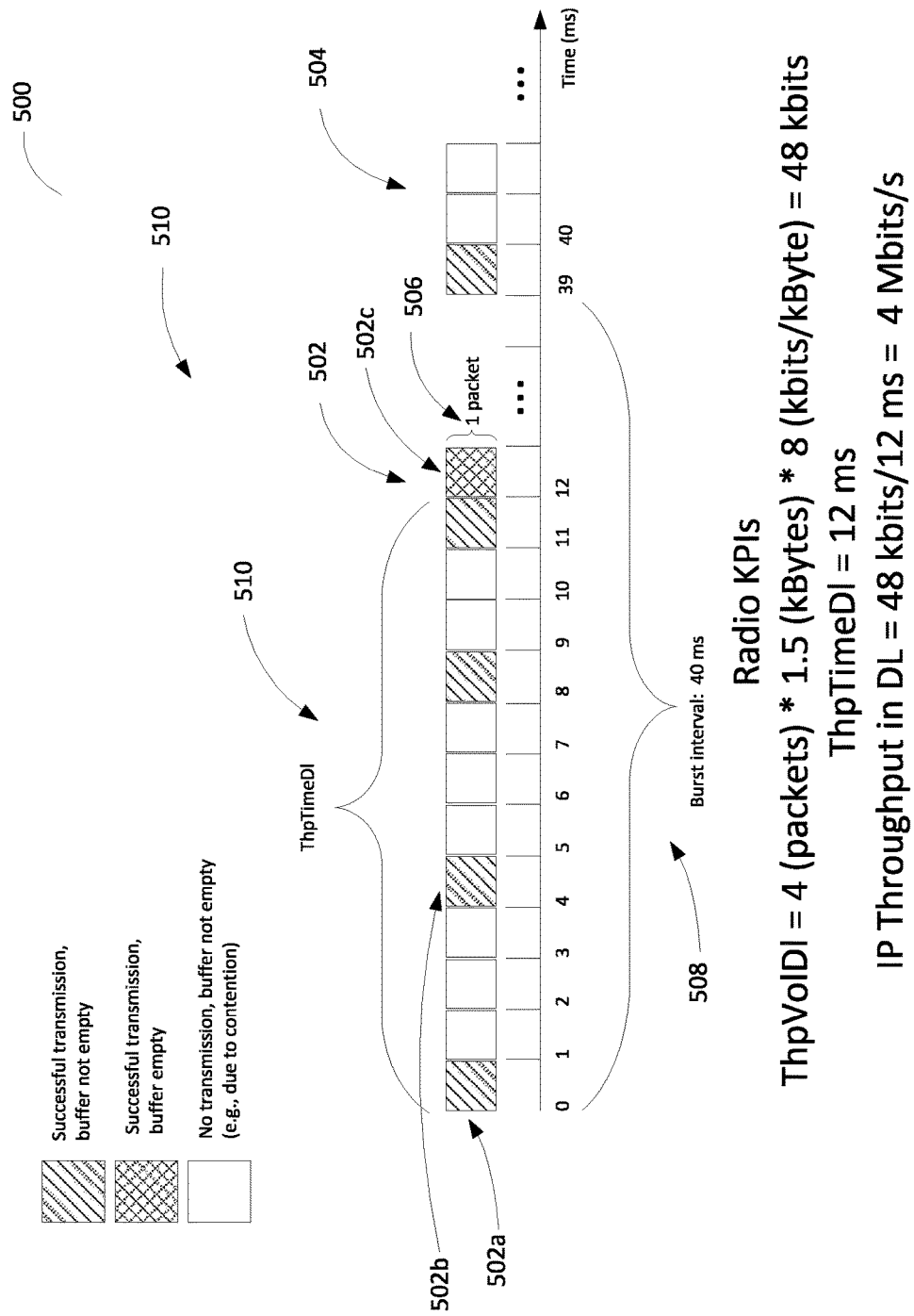
FIG. 5 illustrates an exemplary data flow through a base station buffer in accordance with some embodiments.

FIG. 5 illustrates exemplary burst transmission of data packets. In the example in FIG. 5, a RAN cell is under a high load condition, and thus there is a high amount of contention for downlink transmission resources. In the example in FIG. 5, an exemplary burst transmission (e.g., 502, 504) includes 5 packets (burstSize), which are transmitted in five TTIs every 40 ms (burstInterval). Due to scheduler contention, the five packets are each transmitted (e.g., to the UE) at different TTIs that are not necessarily adjacent in time, one packet at a time: one at 0 ms (502a), one at 4 ms (502b), one at 8 ms, one at 11 ms, and one at 12 ms (502c). The burst transmission 502 has a ThpTimeDl of 12 ms (twelve TTIs) (as indicated by 510) and a burstInterval of 40 ms (as indicated by 508). The application layer MBR of 1.5 Mbps is respected (e.g., 5 packets at 1500 Bytes every 40 ms is 1.5 Mbps). The resulting radio KPI of IP Throughput in DL is 4 Mbps, as shown below.

ThpVoIDl=4 (packets)*1.5 (kBytes)*8 (kbits/kByte)=48 kbits

ThpTimeDl=12 ms

IP Throughput in DL=48 kbits/12 ms=4 Mbits/s

During scheduler contention, many UEs have data in a base station (e.g., eNB) buffer, waiting to be transmitted. For example, the base station does not serve a first UE (the receiver of shaped video data) for one or more TTIs due to contention, and instead the base station serves other UEs by transmitting data to other UEs (e.g., causing the first UE to wait longer to receive the shaped video data) during those one or more TTIs. For the first UE, its respective data remains buffered in the base station (e.g., the ABR shaper does not need to resend it), awaiting transmission when downlink resources become available. When the base station scheduler determines to transmit data for the first UE, then the buffered data is transmitted to the first UE. Because UEs that are connected to the same cell contend for radio resources of that cell, the degradation of the KPI IP Throughput in DL can occur due to this congestion/load causing increased latency.

As can be seen in FIGS. 4 and 5, burst transmission of packets allows for shaped traffic to be included in the KPI IP Throughput in DL, to give a more accurate picture of the downlink throughput of a RAN cell, as compared to evenly spaced single-TTI transmissions. Where throughput is good and there is low/no load, as shown in FIG. 4, IP Throughput in DL is calculated as 84 Mbps. Where throughput is low and there is contention for downlink transmission resources, as shown in FIG. 5, IP Throughput in DL drops to 4 Mbps, however the use of burst transmission allows the shaped traffic to contribute to IP Throughput in DL, making the resulting IP Throughput in DL an improved approximation of RAN cell throughput.

2. Adapting Burst Sizes to Cell Load

While transmitting large bursts causes the IP Throughput in DL to improve, it can also cause momentary increases of scheduler contention if a RAN cell is highly loaded, which can harm Quality of Experience (QoE) of other applications. In some embodiments, a shaper adapts the parameters (e.g., number of packets, burst interval) of burst transmissions based on the current cell load estimate. In some embodiments, a shaper measures and/or estimates cell load condition. As an example, a shaper can start its transmission as described with respect to FIG. 4, where 15-packet bursts are transmitted every 120 ms. If high load is detected, the shaper can change the burst mode to transmit smaller and more frequent batches of packets—for example, 5-packet bursts every 40 ms as described with respect to FIG. 5, in order to reduce the effect of scheduler contention (e.g., latency). For example, by transmitting video data in shorter but more frequent bursts (with the same overall MBR), other (e.g., non-video) applications can get better responsiveness (e.g., reduced latency).

Figure 6:
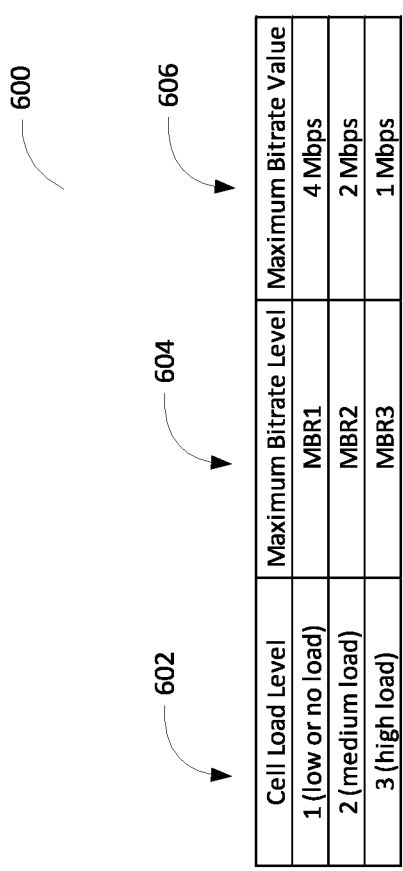
FIG. 6 illustrates correspondence between exemplary cell load levels and exemplary maximum bitrates in accordance with some embodiments.

Techniques for adapting burst size (e.g., amount of data (e.g., bytes) in a burst transmission, number of packets in a burst transmission, size of packets in a burst transmission) are discussed below with respect to FIGS. 6 and 7.

3. Adapting MBR to Cell Load

In some embodiments, a shaper detects cell load and changes a maximum bitrate (also referred to as MBR). For example, a MBR is set such that video data transmitted by the shaper at a rate no higher than the MBR, such that ABR video clients (e.g., at a UE) select lower resolution content based on the reduced bandwidth available for video. For example, this can reduce the total volume of data that a video stream to an ABR video client requires, thus freeing up capacity and potentially improving QoE for non-video applications. In some embodiments, a shaper continuously measures and estimates cell load (e.g., at regular intervals of time). In some embodiments, the shaper associates different MBR policies based on cell load. For example, FIG. 6 illustrates exemplary values and levels of MBR policies. While the example in FIG. 6 illustrates three cell load levels and three corresponding MBR levels and values, any number of levels and/or values can be used. FIG. 6 includes table 600, which includes cell load levels 602, corresponding maximum bitrate (MBR) levels 604, and corresponding maximum bitrate (MBR) values 606. For instance, under a low or no load cell load level (Level 1), a MBR level MBR1 can be used, which corresponds to a MBR of 4 Mbps. For a medium load cell load level (Level 2), a MBR level is MBR2, which corresponds to 2 Mbps. For a high load cell load level (Level 3), a MBR level is MBR3, which corresponds to 1 Mbps.

Figure 7:
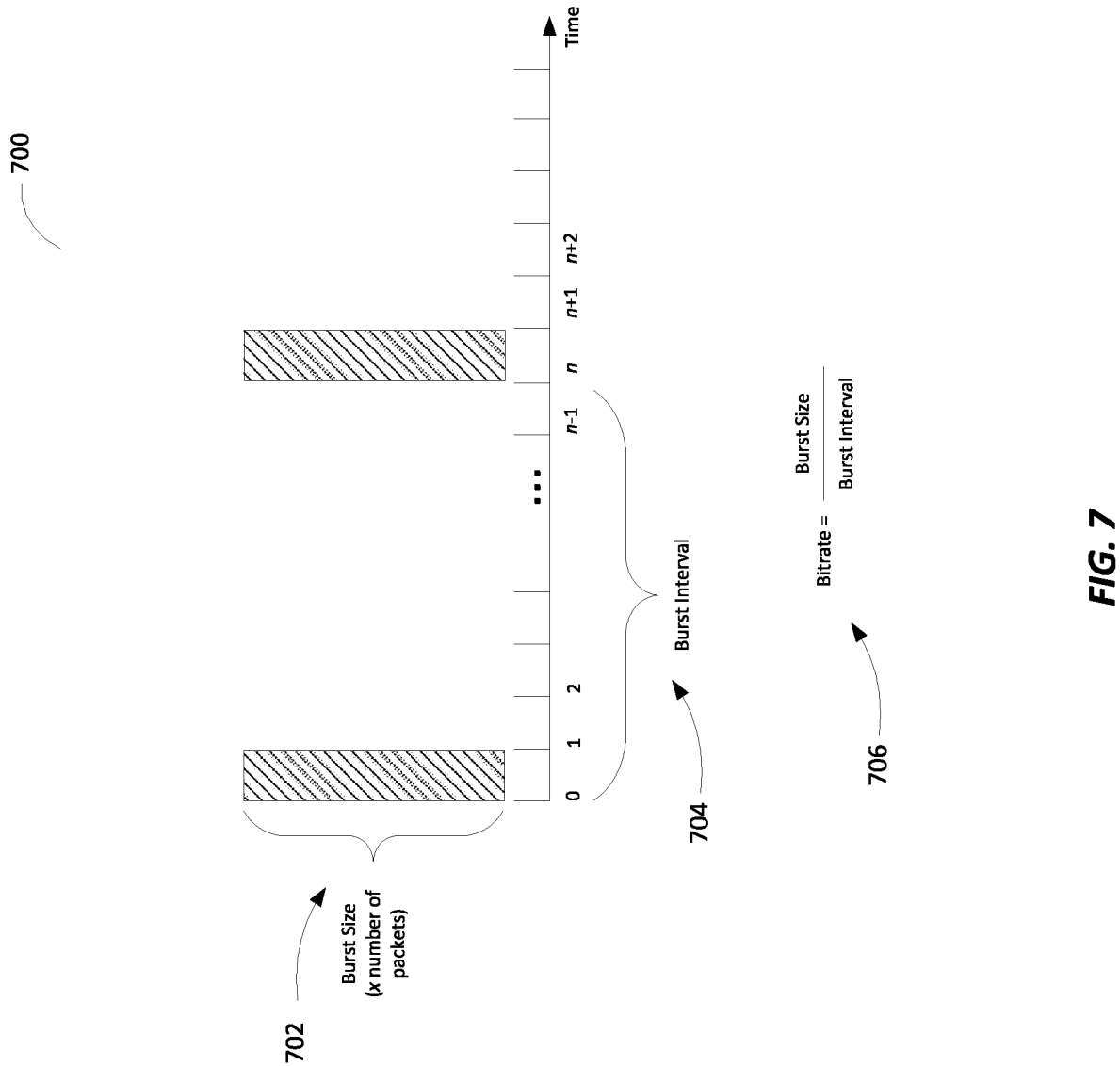
FIG. 7 illustrates correspondence between exemplary burst interval parameters and exemplary bitrate in accordance with some embodiments.

FIG. 7 illustrates exemplary relationship between burst transmission parameters and bitrate (e.g., a MBR). Diagram 700 includes an exemplary timeline of transmission, shown divided into TTI intervals of one time unit (e.g., one millisecond). In diagram 700, a "Burst Size" 702 is x number of packets, and "Burst Interval" 704 is n number of TTI intervals. To calculate the maximum bitrate, Burst Size is divided by Burst Interval (e.g., with proper unit conversion as necessary, such as from Bytes to Bits), as shown in equation 706. Also, for a given desired MBR and Burst Interval, Burst Size can be calculated using this relationship. Likewise, for a given desired MBR and Burst Size, Burst Interval can be calculated using this relationship. Accordingly, an ABR shaper in accordance with some embodiments can use the relationship shown in FIG. 7 to determine burst transmission parameters (e.g., Burst Size, Burst Interval).

B. Determining Cell Load

Adapting burst size or MBR to cell load conditions requires information on cell load. In some embodiments, cell load information is acquired via signaling from a node other than the shaper node. Other nodes can include a 3GPP RCAF (RAN Congestion Awareness Function) or NWDAF (Network Data Analytics Function) or other O&M (which is also referred to as OAM) based solution. While possible, implementing interfaces and obtaining that data in real-time at scale can be very costly. Alternative techniques are described below, where cell load is estimated in the shaper node itself. Notably, adapting burst size or MBR to cell load conditions can be performed irrespective of the cell load detection mechanism.

As described above, an ABR shaper does not usually have a direct interface to a RAN to get explicit and timely information on the current cell load condition. In some embodiments, the current cell load level is estimated based on OSI model transport layer (also referred to as "layer 4") (e.g., Transmission Control Protocol (TCP)) Round Trip Time (RTT) of communications between a shaper and a base station node (e.g., eNB). In some embodiments, an RTT is the time from a shaper sending a packet to the receiving of corresponding acknowledgement packet (also referred to as an "ACK"). For example, the cell load level is detected by the shaped stream itself based on RTT. The rationale behind this is that there is a strong correlation between Radio Link Control (RLC) delay, caused by scheduler contention, and high cell load. The increased RLC delay is visible to an observer of IP traffic as increased RTT. However, relying on unfiltered RTT measurements for determining load levels can cause misclassifications of load condition due to the large number of factors that can momentarily increase the transmission latency (e.g., link layer retransmissions, cell handovers, or other factors). Techniques are described below which relate to using RTT measurements to determine reliable estimates of load conditions.

Figure 8:
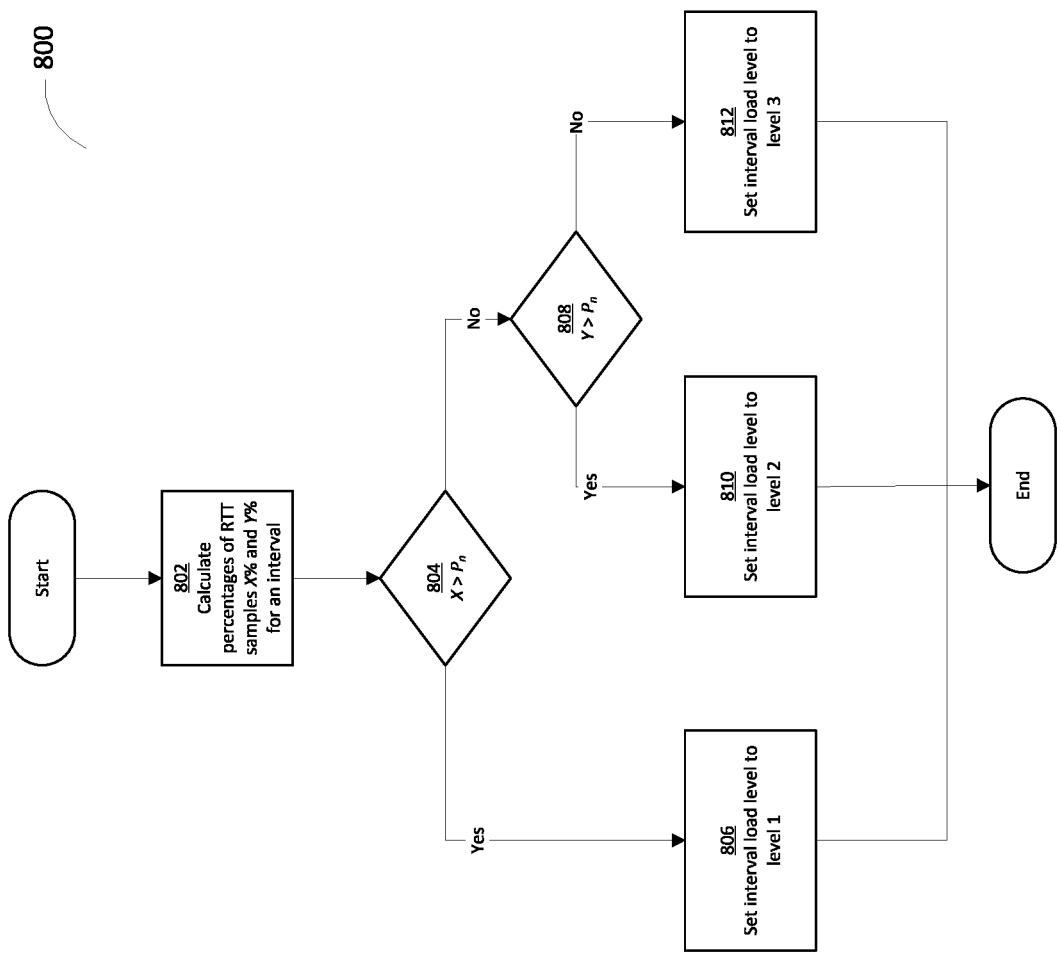
FIG. 8 illustrates an exemplary process for determining interval load level for an interval in accordance with some embodiments.
Figure 9:
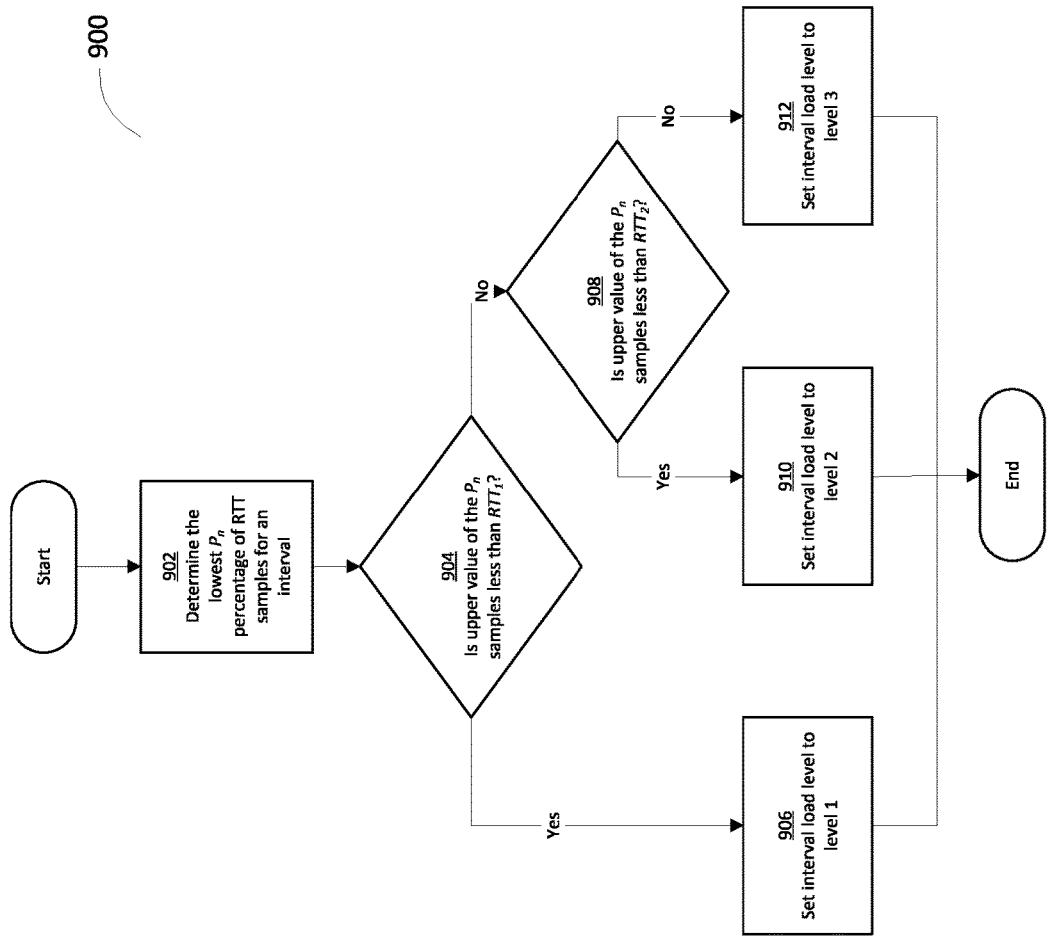
FIG. 9 illustrates an exemplary process for determining interval load level for an interval in accordance with some embodiments.

FIGS. 8 and 9 illustrate techniques for determining interval load based on RTT. In some embodiments, a shaper node performs one or more of the techniques illustrated in therein. As used herein, and unless otherwise noted, "interval load level" refers to an estimated load level experienced by a cell during a respective interval of time. For example, an interval load level is determined based on RTT measurements from communications during the respective interval of time. As used herein, and unless otherwise noted, "cell load level" refers to an estimated load level used to enforce a shaping policy. In some embodiments, one or more interval load levels is used to determine a cell load level. For example, cell load level can be set based on conditions involving one or more interval load levels (e.g., and thus be based on RTTs of communications from one or more intervals). In some embodiments, interval load level and cell load level are the same (e.g., the cell load level is set to be the same as the interval load level). In some embodiments, interval load level and cell load level are different.

FIG. 8 depicts an exemplary process 800 for determining a cell load level during an interval of time. At 802, a shaper node (e.g., a device or system performing the process 800), calculates percentages X % and Y % of RTT samples taken during the interval. In some embodiments, calculating the percentage includes calculating an X % of RTT samples that are less than or equal to a first threshold $RTT_1$ (e.g., X=percentage of RTT samples that are $\leq RTT_1$). For example, the $RTT_1$ threshold (and $RTT_2$, ... $RTT_n$, etc.) is in units of time (e.g., $RTT_1$=100 milliseconds). In some embodiments, calculating the percentage includes calculating a Y % of RTT samples that are below a second threshold $RTT_2$ (i.e., Y=percentage of RTT samples that are $\leq RTT_2$). For example, $RTT_2$ is 150 milliseconds. In some embodiments, one or more additional percentages of RTT samples are calculated based on one or more additional thresholds (e.g., $RTT_3$, $RTT_4$, ... $RTT_n$). In this example, the number of RTT thresholds used correlates with the number of load levels that are selected from—thus, the more thresholds used, the more granularity in load levels that can be determined. In some embodiments, X is calculated first, and if a load level cannot be determined based thereon, then Y is calculated. For example, Y (or further percentages) are only calculated if a load level cannot be determined based on X alone (e.g., at 806, described below), thus reducing unnecessary calculation.

In some embodiments, the shaper determines a plurality of RTT samples during the interval. For example, before calculating the percentages X % and/or Y %, the shaper determines, for each of several communications, the time between sending a respective communication (e.g., a packet) toward the eNB (e.g., to a particular UE, via an eNB), and the time when a corresponding acknowledgement packet is received (e.g., an ACK) (e.g., from the particular UE, via the eNB) (e.g., acknowledging receipt, by the UE, of the respective communication (e.g., video data)). An RTT sample is an amount of RTT (e.g., an amount of time) for one pair of downlink communication and corresponding acknowledgement.

At 804, the shaper determines whether X is greater than a threshold proportion $P_n$ of the RTT samples from the interval. If X is greater than $P_n$, the process proceeds to 806. At 806 the interval load level (also referred to as interval congestion level or interval load) is set to a first level ("level 1"). In some embodiments, $P_n$ is a configurable variable (e.g., can be set to a user-defined value, such as 10%, 15%, 20%, etc.) For example, $P_n$ is a configurable variable and can be set to 10%, and if X % (the percentage of RTT samples that are less than or equal to $RTT_1$) exceeds 10%, then the cell is considered under a low/no load condition (e.g., level 1) during the interval. Stated another way, more than 10% of RTT samples during the interval are below $RTT_1$.

If X is not greater than $P_n$, the process proceeds to 808. At 808, the shaper determines whether Y is greater than the threshold proportion $P_n$ of the RTT samples from the interval. If Y is greater than $P_n$, the process proceeds to 810. At 810, Y is greater than $P_n$, so the interval load level is set to a second level ("level 2"). Stated another way, more than 10% of RTT samples during the interval are below $RTT_2$. For example, $P_n$ is set to 10%, and if Y % (the percentage of RTT samples that are less than or equal to $RTT_2$) exceeds 10%, then the cell is considered under a medium load condition (e.g., level 2) during the interval. Stated another way, more than 10% of RTT samples during the interval are below $RTT_2$.

In some embodiments, $RTT_2$ is greater than $RTT_1$. In some embodiments, RTT thresholds are increasingly large (e.g., $RTT_1 < RTT_2 < ... < RTT_n$).

If Y is not greater than $P_n$, the process proceeds to 812. At 812 the interval load level is set to a third level ("level 3"). For example, $P_n$ is set to 10%, and if Y % (the percentage of RTT samples that are less than or equal to $RTT_2$) does not exceed 10%, then the cell is considered under a high load condition (e.g., level 3).

As one of skill would appreciate, additional load levels can be determined by comparing additional percentages (e.g., Z %) of RTT samples from the interval to $P_n$ (e.g., replacing 812 with a comparison similar to 804 or 808, determining whether Z>$P_n$).

FIG. 9 depicts an exemplary process 900 for determining a cell load level during an interval of time. At 902, a shaper node (e.g., a device or system performing the process 900), determines the lowest $P_n$ percentage of RTT samples taken during the interval. For example, if $P_n$ is equal to 10%, then the shaper determines the 10% of RTT samples from the interval that have the lowest RTT value (e.g., smallest round trip time).

At 904, the shaper determines whether the upper value of the $P_n$ samples is less than a first threshold $RTT_1$ (e.g., an RTT threshold; an amount of time). For example, if there are 100 samples in the lowest $P_n$ (e.g., 10%) of RTT samples, then the highest value of the 100 samples is the upper value. To illustrate, if the largest RTT of any of the 100 samples is 150 ms (e.g., even if multiple RTT samples have that value), the upper value is 150 ms. If the upper value of the $P_n$ samples is less than a first interval $RTT_1$, the process proceeds to 906. At 906, the interval load level is set to a first level ("level 1"). For example, if the upper value of the lowest $P_n$ percentage of samples is less than $RTT_1$, then the cell is considered under a low/no load condition (e.g., level 1). Stated another way, the highest value of the bottom 10% of RTT samples is below $RTT_1$ (meaning that at least 10% of the interval's RTT samples are below $RTT_1$).

If the upper value of the $P_n$ samples is not less than a first interval $RTT_1$, the process proceeds to 908. At 908, the shaper determines whether the upper value of the Pn samples is less than a second threshold $RTT_2$ (e.g., an RTT threshold; an amount of time). If the upper value of the $P_n$ samples is less than a second threshold $RTT_2$, the process proceeds to 910. At 910, the interval load level is set to a second level ("level 2"). For example, because the upper value of the lowest $P_n$ percentage of samples is not less than $RTT_1$ but is less than $RTT_2$, then the cell is considered under a medium load condition (e.g., level 2). Stated another way, the highest value of the bottom 10% of RTT samples is below $RTT_2$ (meaning that at least 10% of the interval's RTT samples are below $RTT_2$). In this example, $RTT_1$ is 100 ms and $RTT_2$ is 150 ms.

If the upper value of the $P_n$ samples is not less than a second threshold $RTT_2$, the process proceeds to 912. At 912, the interval load level is set to a third level ("level 3"). For example, because the upper value of the lowest $P_n$ percentage of samples is not less than $RTT_1$ or $RTT_2$, the cell is considered under a high load condition (e.g., level 3), the top load level in this example (e.g., because only two thresholds are used, $RTT_1$ and $RTT_2$).

In some embodiments, $RTT_2$ is greater than $RTT_1$. In some embodiments, RTT thresholds are increasingly large (e.g., $RTT_1 < RTT_2 < \ldots < RTT_n$).

As one of skill would appreciate, additional load levels can be determined by comparing the upper value of the $P_n$ samples to additional RTT thresholds (e.g., $RTT_3$, $RTT_4, \ldots RTT_n$). For example, process 900 can be modified by replacing 912 with a comparison similar to 904 or 908, determining whether the upper value of the $P_n$ samples is less than $RTT_3$, and so on. Accordingly, for n-number of RTT thresholds, n+1 number of load levels can be determined. For example, more load level representations allows finer granularity of cell load conditions.

In some embodiments, a device continually performs an interval load determination. For example, a shaper node can perform process 800 and/or process 900 to determine an interval load level for each interval. In some embodiments, a device performs an interval load determination at a predetermined load level check interval. For example, the shaper node can determine interval load level after Ti time passes (e.g., every three seconds if Ti=3 seconds). The time Ti can also be referred as an interval length. In some embodiments, interval length is a configurable variable.

Also, steps of process 800 and/or process 900 can be rearranged and/or combined (within the same process, or between the processes, or with steps not explicitly recited herein). As one of skill would appreciate, the processes 800 and/or 900 can be rearranged to determine interval load level in a top-down approach (e.g., using thresholds to first check if a highest load level is satisfied, then a next highest, and so on) to achieve the same result (e.g., an interval load level) without departing conceptually from the techniques described herein. All such variations are intended to be within the scope of this disclosure.

Figure 10:
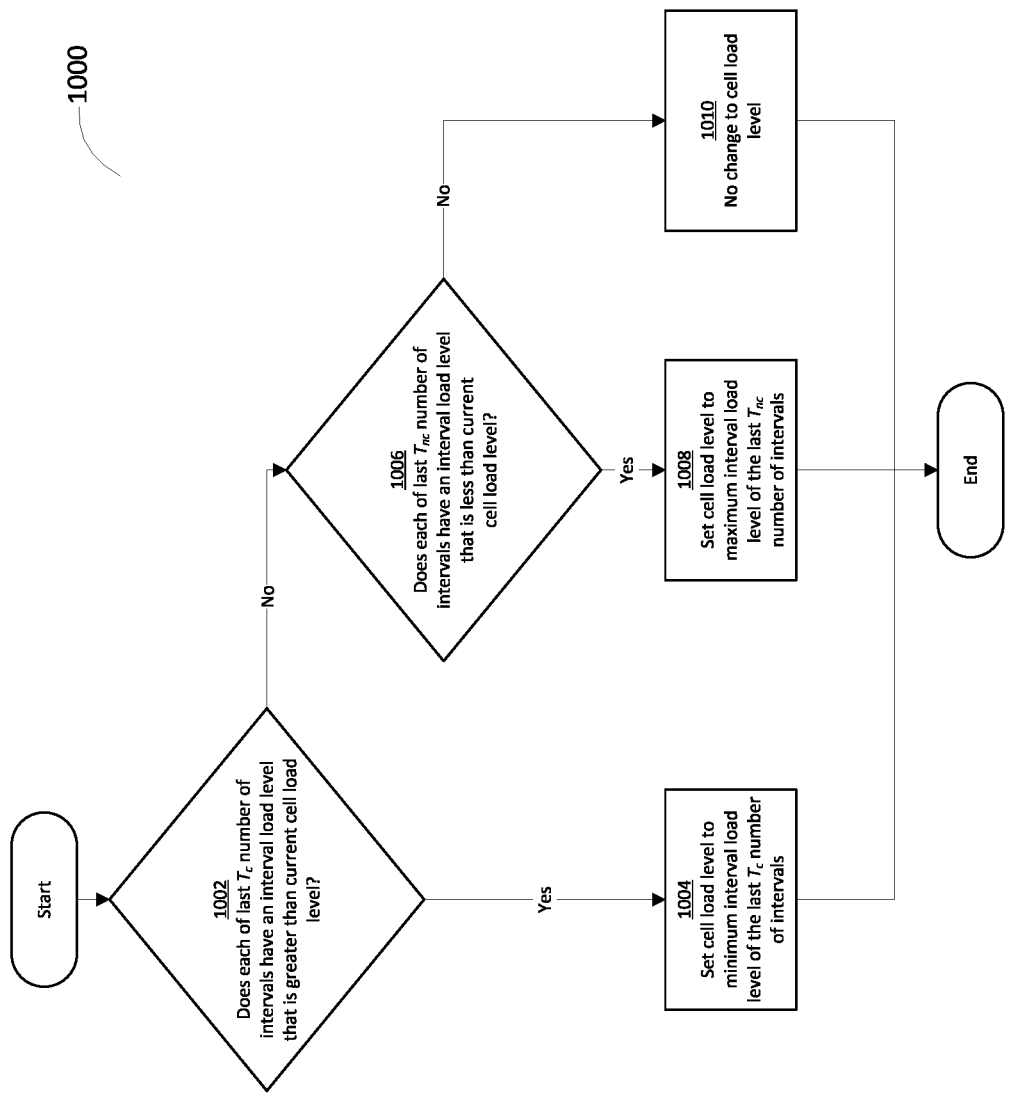
FIG. 10 illustrates an exemplary process for determining cell load level in accordance with some embodiments.

FIG. 10 depicts an exemplary process 1000 for determining a cell load level. In some embodiments, process 1000 is performed by a shaper node (e.g., at regular intervals) to continually update a cell load level. For example, one of processes 800 and/or 900 can be performed in conjunction with process 1000 at the end of each interval Ti.

At 1002, a shaper node (performing the process 1000), determines whether each of the last $T_c$ number of intervals have an interval load level that is greater than the current cell load level. For example, the cell load level is set to a current cell load level, which is, for example, the most recent cell load level (e.g., determined user process 1000). The value $T_c$ is a number, which can be configurable and set to any appropriate value. In this example, $T_c$ is equal to 3, so the shaper node determines if each of the respective interval load levels for the last (most recent) 3 intervals are greater than the current load level. For example, with reference to FIG. 11, the interval load levels for intervals 1, 2, and 3 are [2, 2, 3], respectively, which are each greater than the current cell load level of [1] during intervals 1 through 3. If the last $T_c$ number of intervals have an interval load level that is greater than the current cell load level, process 1000 proceeds to 1004. At 1004, the shaper sets the cell load level to the minimum interval load level of the last T number of intervals. For example, with reference to FIG. 11, after intervals 1, 2, and 3 have a higher interval load than the current cell load, at interval 4 the shaper node has set the current cell load to [2], which is the minimum value of the values [2, 2, 3] for the last $T_c$ intervals.

If each of the last $T_c$ number of intervals do not have an interval load level that is greater than the current cell load level, process 1000 proceeds to 1006. At 1006, the shaper node determines whether each of the last $T_{nc}$ number of intervals have an interval load level that is less than the current cell load level. The value $T_{nc}$ is a number, which can be configurable and set to any appropriate value (e.g., less than, equal to, or greater than the value of Ta). In the example of FIG. 11, $T_{nc}$ is equal to 5, so the shaper node determines if each of the respective interval load levels for the last (most recent) 5 intervals are less than the current load level. For example, with reference to FIG. 11, the interval load levels for intervals 8, 9, 10, 11, and 12 are [2, 1, 2, 1, 2], respectively, which are each less than the current cell load level of [3] during intervals 8 through 12. If the each of the last $T_{nc}$ number of intervals have an interval load level that is less than the current cell load level, process 1000 proceeds to 1008.

At 1008, the shaper sets the cell load level to the maximum interval load level of the last $T_{nc}$ number of intervals. For example, with reference to FIG. 11, after intervals 8, 9, 10, 11, and 12 have a lower interval load than the current cell load of [3] during those intervals, the shaper node has set the current cell load to [2] at interval 13, which is the maximum value of the values [2, 1, 2, 1, 2] for the last $T_{nc}$ intervals.

If the each of the last $T_{nc}$ number of intervals do not have an interval load level that is less than the current cell load level, process 1000 proceeds to 1010. At 1010, no change is made to the current cell load level. For example, with reference to FIG. 11, at interval 20, the last $T_c$ intervals (3 intervals) 17, 18, and 19 have values [1, 1, 1], all of which are not greater than the current load level of [3], and the last $T_{nc}$ intervals (5 intervals) 15, 16, 17, 18, and 19 have values [3, 3, 1, 1, 1], all of which are not less than the current load level of [3]. Accordingly, no change is made to the cell load level at interval 20 (i.e., the cell load level remains [3], the same as during interval 19). In some embodiments, a default initial cell load level is assigned. For example, there may be no value for a current cell load level the first time a process (e.g., 1000) for determining the cell load level is performed, and so a default value is initially used (e.g., a lowest level (level 1, for no/low load), or a highest level (level 3, for high load)).

The steps of process 1000 can be rearranged and/or combined (within the same process, or with other processes described herein (e.g., processes 800 or 900), or with steps not explicitly recited herein). As one of skill would appreciate, the steps of process 1000 can be rearranged to determine cell load level in a different order than presented here (e.g., using thresholds to first check $T_{nc}$, rather than $T_c$) to achieve the same result (e.g., a cell load level) without departing conceptually from the techniques described herein. All such variations are intended to be within the scope of this disclosure.

In some embodiments, a shaper node performs one or more of processes 800, 900, 1000, and 1200 (described below), for each of a plurality of user equipment receiving video data. For example, where the shaper node determines cell load by itself based on RTT (e.g., using 800, 900, 1000, and/or 1200), the shaper node might not differentiate a specific cell from another. For instance, from the perspective of the shaper node, a first UE (e.g., having a client IP address) is coming from a cell (e.g., cell A). The shaper node can measure the RTTs of the first UE's communication, and estimate the load level of the cell of the first UE (cell A) based on the characteristics of the measured RTTs (as described herein). The shaper node can do the same thing for a second UE (or a plurality of additional UEs) that is coming from another cell (e.g., cell B). The cell A and cell B could be different cells, or they could be the same cell, however the shaper node does not necessarily need to discern whether they are the same or different. That is, the cell load is not necessarily tracked per cell, but is tracked per UE. However, the determined cell load is nonetheless an estimate of the cell load experienced by a cell corresponding to (e.g., connected to) a UE.

FIG. 11 depicts table 1100, which illustrates the relationship between intervals, RTT samples, interval load level, and cell load level, in accordance with some embodiments. In the example illustrated by table 1100, an interval load check is performed every three seconds (i.e., Ti=3 seconds). Further, $T_c$=3 intervals, $T_{nc}$=5 intervals, $RTT_1$=100 milliseconds, $RTT_2$=150 ms, and $P_n$=10%.

The first row of table 1100 includes an identifier for each of several intervals of time, in this example sequential intervals of time, each defining a column for values related to that respective interval. For example, each interval in table 1100 represents a three-second-long block of time.

The second row of table 1100 represents the upper bound (maximum) value of the lowest 10% of RTT samples during the respective interval. In this example, the upper bound value has a unit of milliseconds (ms). Thus, for interval number 1 in table 1100, the upper bound of the lowest 10% is an RTT of 110 milliseconds. For further example, for interval number 7, the upper bound is 155 ms.

The third row of table 1100 includes an interval load level for the respective interval. For example, the interval load level listed under a respective interval number represents an interval load level determined based on the RTT samples from that interval. In this example, the interval load levels are determined in accordance with the techniques described with respect to FIG. 9, whereby an upper value of the $P_n$ percentage of RTT samples is compared to one or more thresholds ($RTT_1$, $RTT_2$) to determine one of three load levels to assign to an interval (e.g., level 1, 2, or 3). As noted above, because $RTT_1$ is 100 ms and $RTT_2$ is 150 ms, an interval with an upper bound less than 100 ms will be load level 1 (e.g., intervals 9, and 17 through 22 in table 1100), an interval with an upper bound not less than 100 ms and less than 150 ms will be load level 2 (e.g., intervals 1, 2, 4, 8, 10, 12, and 13), and an interval with an upper bound not less than 150 ms will be load level 3 (e.g., intervals 3, 5 through 7, and 14 through 16).

The fourth row of table 1100 includes the cell load level during each of the intervals. In this example, the cell load level listed for a given interval is determined in accordance with the technique described above with respect to FIG. 10, as previously discussed.

Figure 12:
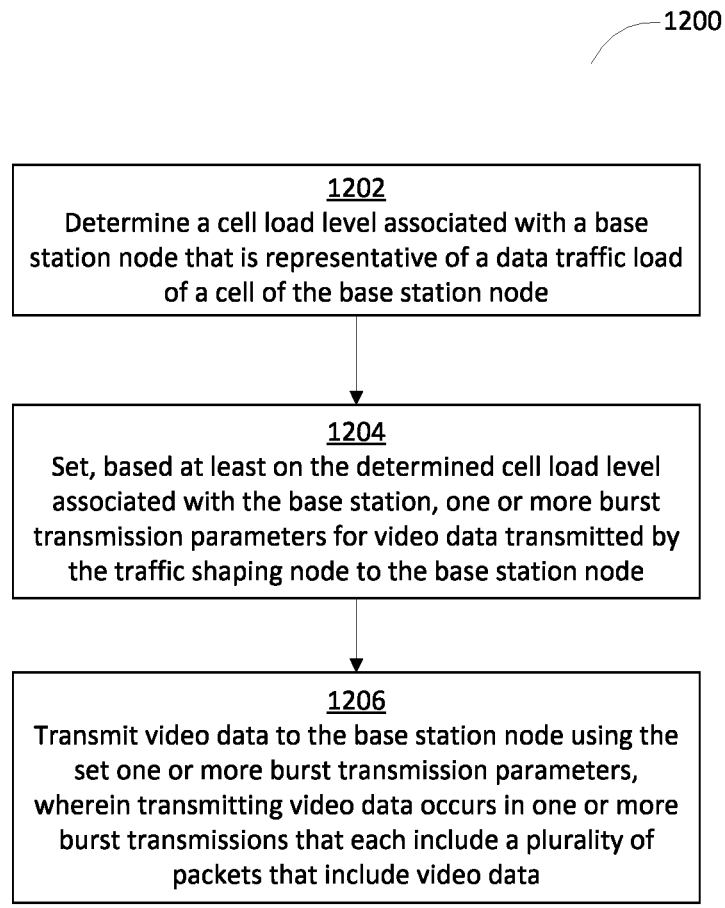
FIG. 12 illustrates an exemplary process for determining and utilizing cell load level in accordance with some embodiments.

FIG. 12 illustrates an exemplary process 1200 for shaping video data traffic in a packet switched communications transport network in accordance with some embodiments. Process 1200 can be performed by one or more devices as described here (e.g., 1304, 1430, 1510).

At 1202, a shaper node (e.g., 1304, 1430, 1510) determines a cell load level associated with a base station node that is representative of a data traffic load of a cell of the base station node. For example, the device performs one or more of processes 800, 900, and 1000 above. For further example, the device receives the cell load level (or information for determining the cell load level) from another node.

At 1204, the traffic shaping node (also referred to as a shaper node) sets, based at least on the determined cell load level associated with the base station, one or more burst transmission parameters for video data transmitted by the traffic shaping node to the base station node. For example, the burst transmission parameters can include burst interval and/or burst size (e.g., number of packets in a burst transmission).

At 1206, the traffic shaping node transmits video data to the base station node using the set one or more burst transmission parameters, wherein transmitting video data occurs in one or more burst transmissions that each include a plurality of packets that include video data. For example, the burst transmission is sent as shown in FIG. 4 (15 packets every 120 ms), as shown in FIG. 5 (5 packets every 40 ms), or with different parameters. In some embodiments, transmitting the video data to the base station node includes transmitting the video data to one or more intermediary nodes (e.g., that send the data to the base station node). In some embodiments, the video data is adaptive bitrate video data. In some embodiments, the video data is associated with a first user equipment device. In some embodiments, the traffic shaping node performs one or more of blocks 1202, 1204, and 1206 for video data (e.g., adaptive bitrate video data) associated with a second user equipment device (e.g., associated with the same cell as the first user equipment device, or a different cell as the first user equipment device) (e.g., associated with the same base station node as the first user equipment device, or a different base station node as the first user equipment device). In some embodiments, the traffic shaping node performs one or more of blocks 1202, 1204, and 1206 for video data (e.g., adaptive bitrate video data) associated with a plurality (e.g., two or more) of user equipment devices (e.g., each associated with the same cell as the first user equipment device, or a different cell as the first user equipment device) (e.g., each associated with the same base station node as the first user equipment device, or a different base station node as the first user equipment device).

In some embodiments, setting the one or more burst transmission parameters comprises setting one or more of: a total amount of data (e.g., number of Bytes) included in the plurality of packets of each burst transmission (e.g., amount of data in all packets in the burst transmission combined); and an interval of time between burst transmissions of the one or more burst transmissions (e.g., time between beginning of one burst transmission and the next sequential burst transmission). In some embodiments, setting the total amount of data (e.g., number of Bytes) included in the plurality of packets of each burst transmission (e.g., all packets in the burst transmission combined) comprises setting one or more of: a number of data packets included in the plurality of packets of each burst transmission (e.g., an integer number (e.g., 5, 10, 15) of packets per burst); and an amount of data included in each data packet included in the plurality of packets of each burst transmission (e.g., number of Bytes per packet). For example, setting the one or more burst transmissions parameters involves setting the total amount of data (e.g., number of Bytes) that is sent per burst transmission, which can be achieved by setting the number of packets and/or the data size of those packets. The interval can be changed (along with the amount of data) in order to respect maximum bitrate policies.

In some embodiments, the traffic shaping node determines, based at least in part on the cell load level, a maximum bitrate for video data transmitted by the traffic shaping node to the base station node. For example, the determined MBR is determined based on an MBR policy, such as shown in FIG. 6. In some embodiments, an MBR policy defines the relationship between cell load level and maximum bitrate for video data enforced by the traffic shaping node. In some embodiments, setting the one or more transmission parameters comprises: setting, based at least in part on the determined maximum bitrate, the total amount of data included in the plurality of packets in each burst transmission; and setting, based at least in part on the determined maximum bitrate, the interval of time between burst transmissions of the one or more burst transmissions. For example, the shaper node uses the equation described with respect to FIG. 7, (Bitrate=Burst Size/Burst Interval), to determine appropriate burst size and burst interval based on the determined bitrate.

In some embodiments, determining the cell load level associated with the base station node is based on round trip time (RTT) of communication between the traffic shaping node and the base station node. In some embodiments, a round trip time is an amount of time between a first time and a second time, wherein the first time corresponds to when the traffic shaping node transmits a data packet toward the base station node, and wherein the second time corresponds to when the traffic shaping node receives a corresponding acknowledgement from the base station node. For example, the RTT is a time between when a packet is sent by the shaper toward a base station node (e.g., eNB), and when a corresponding acknowledgment packet (e.g., ACK) is received by the shaper node. As a specific example, the data packet can originate from a video provider node via the internet, and has a destination that is a UE; the data packet traverses one or more networks to reach the UE, e.g. sent by a video provider, to External Packet Switched Network (internet), to Operator's Packet Switched Network (which includes an ABR Shaper as a node or component in it), to an eNB, to the UE. In this example, the ACK traverses the opposite way (e.g., from UE to the video provider). In this way, an ABR shaper can transmit a data packet toward the base station node, even when the ultimate destination is a UE.

In some embodiments, determining the cell load level associated with the base station node comprises: determining a plurality of RTTs of a plurality of communications between the traffic shaping node and the base station node from a plurality of intervals of time. For example, as described above with respect to FIGS. 8, 9, and 11, round trip times for communications occurring during several intervals of time are determined. In some embodiments, determining the cell load level associated with the base station node comprises: determining a plurality of interval load levels that include respective interval load levels for each interval of time of the plurality of intervals of time based on RTTs of the plurality of RTTs. For example, the shaper performs one or more of processes 800 and 900 to determine an interval load level for each interval of time. In some embodiments, in accordance with a determination (e.g., at 1002 of process 1000) that at least a first number (e.g., $T_c$ in process 1000) of interval load levels of the plurality of interval load levels match first time trend criteria (e.g., first time trend criteria being matched if each of last T number of intervals have an interval load level that is greater than the current cell load level), the traffic shaping node sets (e.g., at 1004) the cell load level to be a minimum interval load level of the first number of interval load levels. For example, in FIG. 11 a cell load level is set to level 2 at interval number 4, which is the minimum level of the previous 3 intervals (an exemplary $T_c$) 1 through 3, as described above. In some embodiments, in accordance with a determination that at least a second number (e.g., $T_{nc}$ in process 1000) (e.g., less than, equal to, or greater than the first number) of interval load levels of the plurality of interval load levels match second time trend criteria different from the first time trend criteria (e.g., second time trend criteria being matched if each of last $T_{nc}$ number of intervals have an interval load level that is less than the current cell load level), the traffic shaping node sets (e.g., at 1008) the cell load level to be a maximum interval load level of the second number of interval load levels. For example, in FIG. 11, a cell load level is set to level 2 at interval number 13, which is the maximum level of the previous 5 intervals (an exemplary $T_{nc}$) 8 through 12, as described above. In some embodiments, the determination of whether the at least the second number of interval load levels of the plurality of interval load levels match second time trend criteria is performed in accordance with a determination that the at least the first number of interval load levels of the plurality of interval load levels do not match first time trend criteria. For example, as shown in FIG. 10, process 1000 proceeds to 1006 if the determination at 1002 is negative (e.g., first time trend criteria is not met). In some embodiments, in accordance with a determination that the at least the first number of intervals and the at least the second number of intervals do not match the first time trend criteria and the second time trend criteria, respectively, the traffic shaping node performs no change (e.g., at 1010) to the cell load level (e.g., cell load level remains the same value for the given interval that it had for the previous interval). For example, the previous cell load level is used as a current cell load level (e.g., the same value is written into memory), or the current cell load level is not edited (e.g., not overwritten).

In some embodiments, determining the plurality of interval load levels comprises, for each respective interval of time of the plurality of intervals of time: determining a plurality of RTTs of a plurality of communications between the traffic shaping node and the base station node from the respective interval of time. In some embodiments, the traffic shaping node determines, based at least in part of the plurality of RTTs from the respective interval of time, that one or more interval load criteria is met for the respective interval of time. For example, the traffic shaping node performs one or more of processes 800 and 900 for determining interval load level. Exemplary interval load criteria are illustrated at 804, 808, 904, and 908. For example, at 904, the traffic shaping node performing process 900 determines whether the following criteria is met: is the upper value of the $P_n$ samples less than $RTT_1$? In some embodiments, the traffic shaping node sets the respective interval load level of the respective interval of time to be a load level of a plurality of interval load levels (e.g., 2 levels, 3 levels, 4 levels, . . . , or n levels), wherein the load level is selected from the plurality of interval load levels based at least in part on the one or more interval load criteria that is met for the respective interval of time. For example, in processes 800 and 900, three total exemplary interval load levels are shown.

In some embodiments, determining that one or more interval load criteria is met for the respective interval of time and setting the respective interval load level comprises: determining (e.g., at 902) a first proportion (e.g., $P_n$) of RTTs of the plurality of RTTs from the respective interval of time that have the lowest RTT values of the plurality of RTTs from the respective interval of time. In some embodiments, in accordance with a determination (e.g., Yes at 904) that an upper bound RTT value of the first proportion of RTTs is less than a first RTT threshold (e.g., $RTT_1$ in process 900), the traffic shaping node sets (e.g., 906) the respective interval load level of the respective interval of time to be a first load level (e.g., level 1 in process 900) of the plurality of interval load levels. In some embodiments, in accordance with a determination (e.g., No at 904) that the upper bound RTT value of the first proportion of RTTs is equal to or larger than the first RTT threshold, the traffic shaping node forgoes setting the respective interval load level of the respective interval of time to be the first load level of the plurality of interval load levels (e.g., does not proceed to 906); and sets (e.g., at 910 or at 912) the respective interval load level of the respective interval of time to be an interval load level (e.g., level 2, or level 3 in process 900) of the plurality of interval load levels different from the first interval load level of the plurality of interval load levels.

In some embodiments, setting the respective interval load level of the respective interval of time to be an interval load level different from the first interval load level comprises: in accordance with a determination (e.g., Yes at 908) that the upper bound RTT value of the first proportion is less than a second RTT threshold (e.g., $RTT_2$ in process 900), the traffic shaping node sets (e.g., at 910) the respective interval load level of the respective interval of time to be a second load level (e.g., level 2 in process 900) of the plurality of interval load levels, wherein the second load level is different from the first load level (e.g., level 1 in process 900), and wherein the second RTT threshold is larger than the first RTT threshold. In some embodiments, in accordance with a determination (e.g., No at 908) that the upper bound RTT value of the first proportion is equal to or larger than the second RTT threshold the traffic shaping node: forgoes setting the respective interval load level to be the first load level (e.g., does not proceed to 906); forgoes setting the respective interval load level to be the second load level (e.g., does not proceed to 910); and sets (e.g., at 912) the respective interval load level to be an interval load level (e.g., level 3 in process 900) of the plurality of interval load levels different from the first load level and different from the second load level.

In some embodiments, determining that one or more interval load criteria is met for the respective interval of time and setting the respective interval load level comprises: the traffic shaping node determines a second proportion (e.g., X % in process 800) of RTTs of the plurality of RTTs from the respective interval of time that are less than or equal to a third RTT threshold (e.g., $RTT_1$). In some embodiments, in accordance with a determination (e.g., Yes at 804) that the second proportion of RTTs is larger than a first proportion threshold (e.g., $P_n$ in process 800), the traffic shaping node sets (e.g., at 806) a respective interval load level of the respective interval to be a third load level (e.g., level 1 in process 800) of the plurality of interval load levels. In some embodiments, in accordance with a determination (e.g., No at 804) that the second proportion of RTTs is less than or equal to the first proportion threshold, the traffic shaping node: forgoes setting the respective interval load level to be the third load level of the plurality of interval load levels (e.g., does not proceed to 806); and sets (e.g., at 810) the respective interval load level to be a load level (e.g., level 2 or level 3 of process 800) of the plurality of interval load levels different from the third interval load level of the plurality of interval load levels.

In some embodiments, setting the respective interval load level to be an interval load level different from the third interval load level comprises: the traffic shaping node determines a third proportion of RTTs (e.g., Y % in process 800) of the plurality of RTTs from the respective interval of time that are less than or equal to a fourth RTT threshold (e.g., $RTT_2$), wherein the fourth RTT threshold is larger than the third RTT threshold. In some embodiments, in accordance with a determination (e.g., Yes at 808) that the third proportion of RTTs is larger than a second proportion threshold (e.g., $P_n$ in process 800, or a value different than Pa), the traffic shaping node sets (e.g., at 810) the respective interval load level of the respective interval to be a fourth load level (e.g., level 2 in process 800) of the plurality of interval load levels. In some embodiments, in accordance with a determination (e.g., No at 808) that the third proportion of RTTs is less than or equal to the second proportion threshold, the traffic shaping node: forgoes setting the respective interval load level to be the third load level (e.g., does not proceed to 806); forgoes setting the respective interval load level to be the fourth load level (e.g., does not proceed to 810); and sets (e.g., at 812) the respective interval load level to be a load level (e.g., level 3 of process 800) of the plurality of interval load levels different from the third load level and different from the fourth load level.

In some embodiments, the first time trend criteria and the second time trend criteria each include a different one of the following criteria: each of the respective number of interval load levels (e.g., the number of intervals associated with the time trend criteria) of the plurality of interval load levels is less than a current value of the cell load level; and each of the respective number of interval load levels (e.g., the number of intervals associated with the time trend criteria) of the plurality of interval load levels is greater than a current value of the cell load level. For example, in process 1000 a first time trend criteria includes the criteria (and is met if) each of last $T_c$ number of intervals (an exemplary respective number of interval load levels for the first time trend criteria) have an interval load level that is greater than current cell load level, and a second time trend criteria includes the criteria (and is met if) each of last $T_{nc}$ number of intervals (an exemplary respective number of interval load levels for the second time trend criteria) have an interval load level that is less than the current cell load level.

In some embodiments, determining the cell load level associated with the base station node comprises acquiring the cell load level via communication from a node, other than the traffic shaping node, responsible for one or more of measuring and reporting radio access network (RAN) user-plane congestion. For example, the traffic shaping node can receive a communication from an external node (e.g., device) that includes information regarding cell load. Such external nodes can includes one or more of nodes that perform 3GPP RAN Congestion Awareness Function (RCAF) or Network Data Analytics Function (NWDAF) or other Operations, Administration, and Management (OAM) based solutions (e.g., device 1310).

Figure 13:
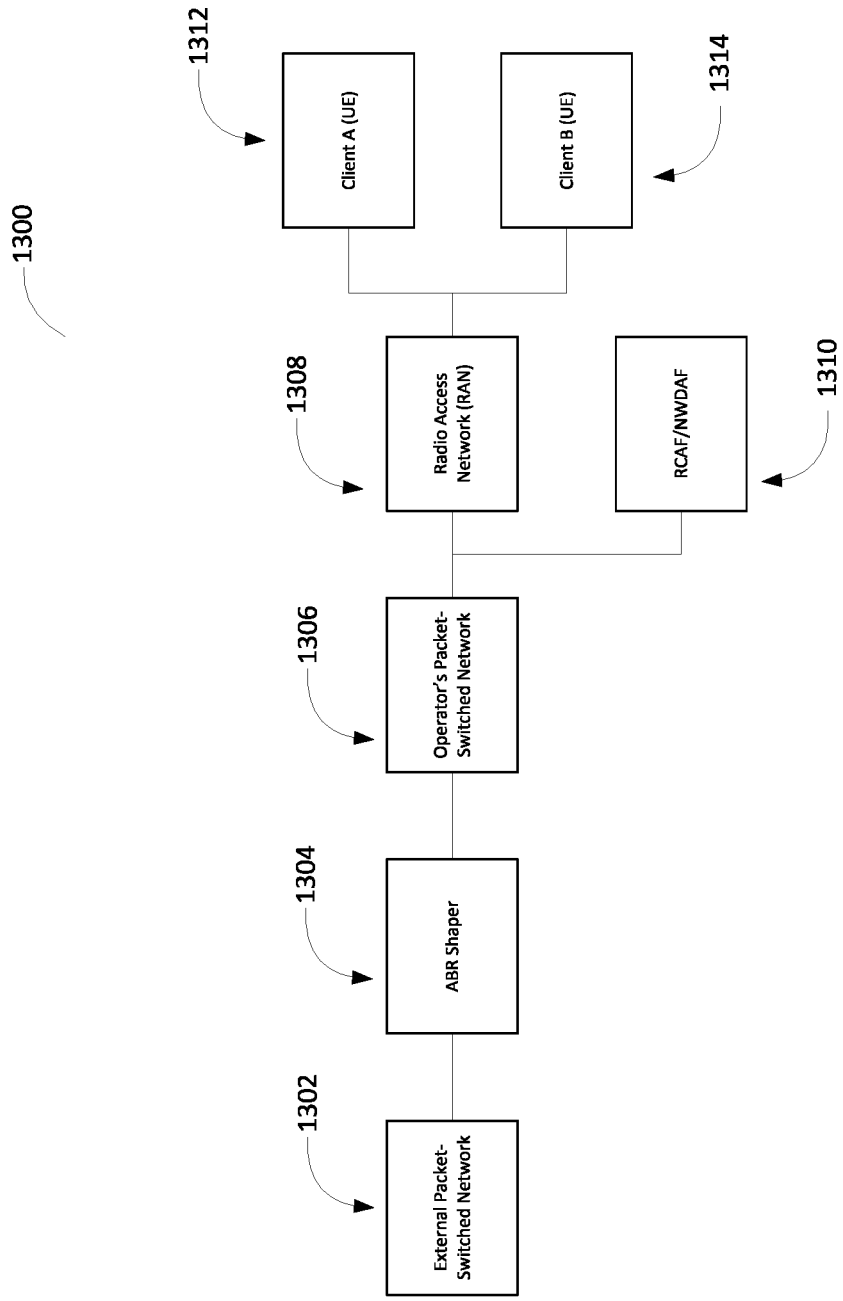
FIG. 13 illustrates a diagram of an exemplary telecommunication network in accordance with some embodiments.

FIG. 13 illustrates an exemplary block diagram of functional blocks of an exemplary telecommunications network 1300 (e.g., a packet switched communications transport network) (e.g., a cellular-based communication network) in accordance with some embodiments. The blocks in FIG. 13 are described with respect to their general functions, and it should be understood that each individual block can be performed by one or more devices or systems, and/or that the blocks within network 1300 can be rearranged and/or combined in any fashion while still performing the same or substantially similar functions, which is intended to be within the scope of this disclosure.

Block 1302 represents an external packet-switched network (e.g., external to a service provider that controls a radio access network and core network). For example, block 1302 can represent one or more public or private networks usable to connect to content providers (e.g., of video data). Block 1302 can be one of, or a combination of more than one of, a public, private or hosted network; it can be a backbone network or the Internet; and it can comprise two or more sub-networks.

Block 1304 represents an ABR shaper, which can also be referred to as an ABR traffic shaping node, a traffic shaping node, or the like. Block 1304 performs traffic shaping of data passing from block 1302 to block 1306. Such traffic shaping can include, for example, burst transmission of particular data (e.g., video data) and/or enforcement of maximum bitrate of video data.

Block 1306 represents an operator's packet-switched network. Block 1306 performs packet-switched routing of data within a telecommunication network operator's network (e.g., using internet protocol (IP) addresses to route data to appropriate requesting UEs). Block 1304 (ABR Shaper) can be part of block 1306.

Block 1308 represents a radio access network (RAN). Block 1308 includes functionality for connecting the operator's packet-switched network to client UE devices (e.g., including managing radio communication and data flow to the UE devices).

Block 1310 represents a 3GPP RAN Congestion Awareness Function (RCAF) or Network Data Analytics Function (NWDAF) or other O&M based solution. Block 1310 can be optional, or be a function included in another block in network 1300 (e.g., in 1306).

Blocks 1312 and 1314 each represent a client UE device (Client A and Client B, respectively) that is connected to the operator's packet switched-network via a RAN. For example, a client UE device (Client A) can request video data from block 1302 (External Packet Switched Network) (e.g., a website), which is shaped by block 1304 (ABR Shaper) and passed on to blocks 1306 (Operator's Packet Switched Network) and 1308 (RAN), after which corresponding video data is then transmitted to the client (e.g., Client A).

Figure 14:
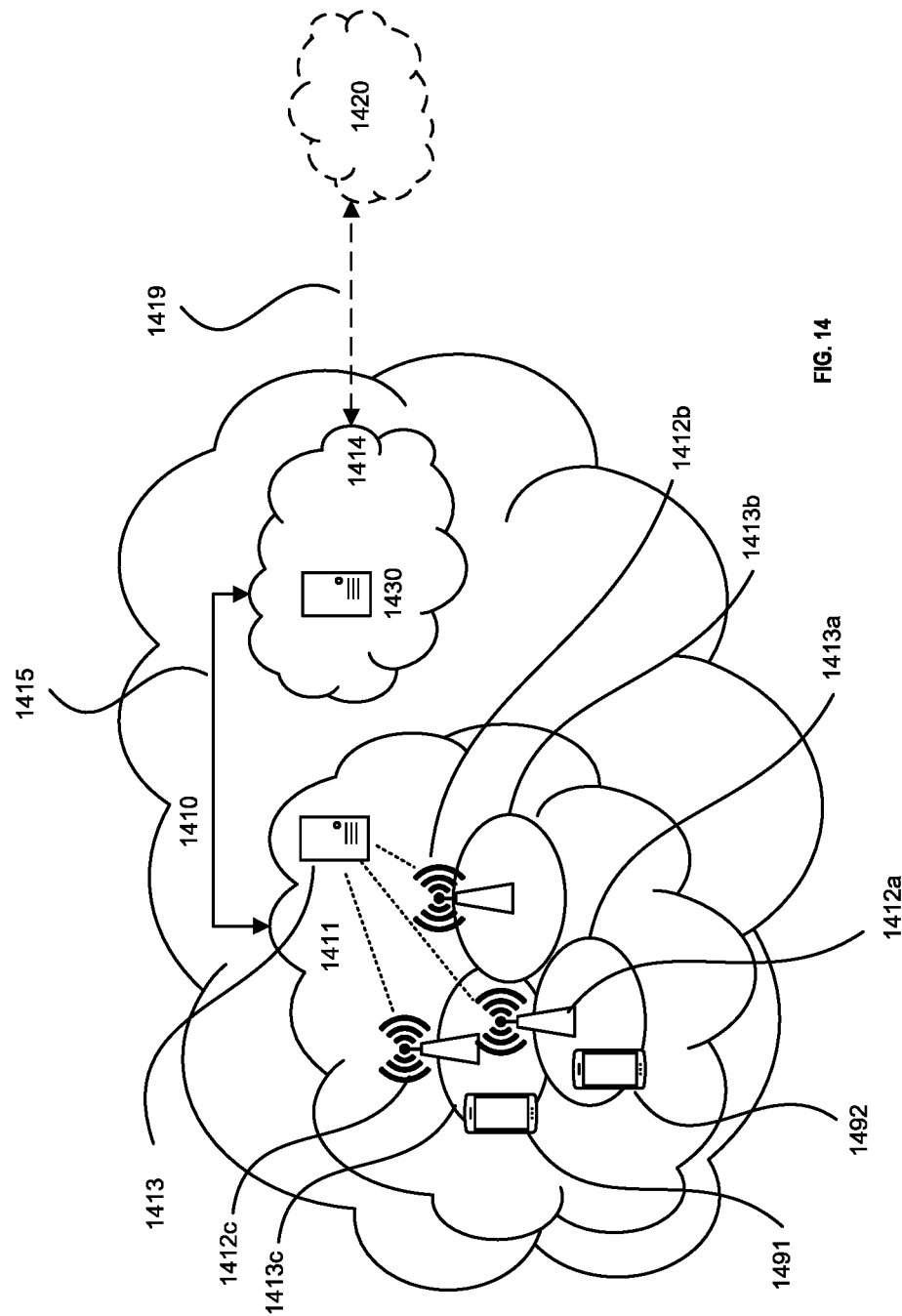
FIG. 14 illustrates a diagram of an exemplary telecommunication network in accordance with some embodiments.

With reference to FIG. 14, in accordance with some embodiments, a communication system includes telecommunication network 1410 (e.g., a packet switched communications transport network), such as a 3GPP-type cellular network, which comprises access network 1411, such as a radio access network, and core network 1414. Access network 1411 comprises a base station 1413, such as an NB, eNodeB (eNB), gNB or other type of wireless access point, connected to a plurality of cells 1412a, 1412b, 1412c, each defining a corresponding coverage area 1413a, 1413b, 1413c. In some embodiments, a base station serves a single cell. In some embodiments, a base station serves multiple cells (e.g., a shown in FIG. 14). Each cell 1412a, 1412b, 1412c is connectable via base station 1413 to core network 1414 over a wired or wireless connection 1415. Core network 1414 includes one or more nodes, such as traffic shaper node 1430. A first UE 1491 located in coverage area 1413c is configured to wirelessly connect to, or be paged by, the corresponding cell 1412c. A second UE 1492 in coverage area 1413a is wirelessly connectable to the corresponding cell 1412a. While a plurality of UEs 1491, 1492 are illustrated in this example, the disclosed embodiments are equally applicable to a situation where a sole UE is in the coverage area or where a sole UE is connecting to the corresponding base station 1413 via a cell 1412.

Telecommunication network 1410 is itself connected to one or more additional network 1420 via one or more wired or wireless connection 1419. Connection 1419 between telecommunication network 1410 and additional network 1420 may extend directly from core network 1414 to host computer 1430 or may go via an optional intermediate network. Additional network 1420 may be one of, or a combination of more than one of, a public, private or hosted network; additional network 1420, if any, may be a backbone network or the Internet; in particular, additional network 1420 may comprise two or more sub-networks (not shown). Additional network 1420 may be under the ownership or control of a service provider, or may be operated by the service provider or on behalf of the service provider.

The communication system of FIG. 14 as a whole enables connectivity between the connected UEs 1491, 1492 and additional network 1420. For example, the additional network 1420 can include a host computer that serves adaptive bitrate video content to one or more UE (e.g., 1491, 1492) connected to telecommunication network 1410. The connectivity may be described as an over-the-top (OTT) connection. Host computers in network 1420 and the connected UEs 1491, 1492 are configured to communicate data and/or signaling via such OTT connection, using access network 1411, core network 1414, any additional network 1420 and possible further infrastructure (not shown) as intermediaries.

Example implementations, in accordance with an embodiment, of the UE, base station and traffic shaping node discussed in the preceding paragraphs will now be described with reference to FIG. 15. In communication system 1500 (e.g., a packet switched communications transport network), traffic shaping node 1510 comprises hardware 1515 including communication interface 1516 configured to set up and maintain a wired or wireless connection with an interface of a different communication device of communication system 1500. Traffic shaping node 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Traffic shaping node 1510 further comprises software 1511, which is stored in or accessible by traffic shaping node 1510 and executable by processing circuitry 1518. Software 1511 includes traffic shaping application 1512. Traffic shaping application 1512 may be operable to provide traffic shaped video data to a remote user, such as UE 1530 connecting via connections 1560 and 1570.

Communication system 1500 further includes base station 1520 provided in a telecommunication system and comprising hardware 1525 enabling it to communicate with traffic shaping node 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to traffic shaping node 1510. Connection 1560 may be direct or it may pass through one or more other nodes of a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service (e.g., display of adaptive bitrate video) to a human or non-human user via UE 1530, with the support of traffic shaping node 1510.

Figure 15:
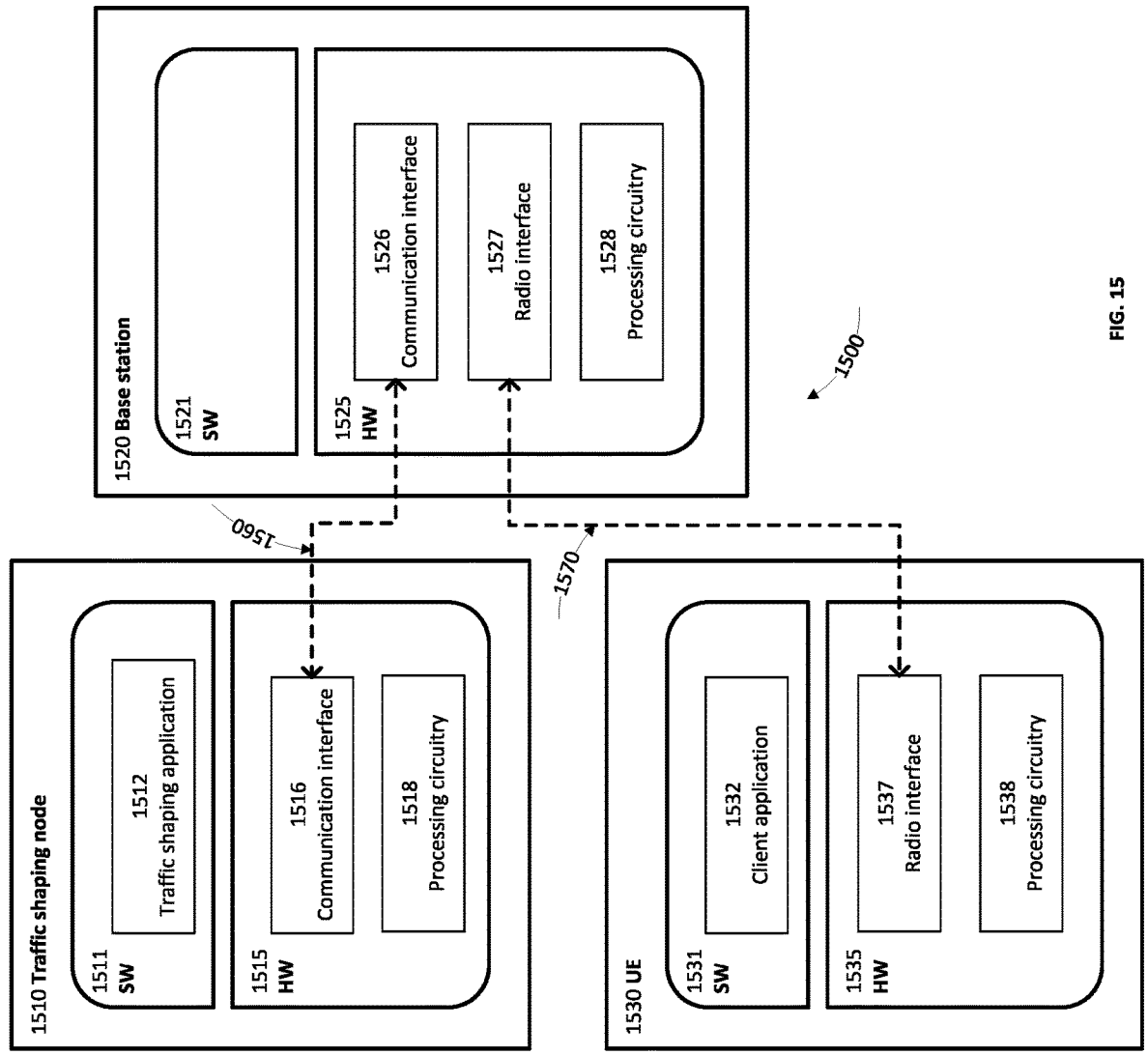
FIG. 15 illustrates a diagram of an exemplary telecommunication network in accordance with some embodiments.

It is noted that traffic shaping node 1510, base station 1520 and UE 1530 illustrated in FIG. 15 may be similar or identical to traffic shaping node 1430, base station 1413, and one of UEs 1491, 1492 of FIG. 14, respectively. This is to say, the inner workings of these entities may be as shown in FIG. 15 and independently, the surrounding network topology may be that of FIG. 14.

Wireless connection 1570 between UE 1530 and base station 1520 is in accordance with the teachings of the embodiments described throughout this disclosure. One or more of the various embodiments improve the performance of OTT services provided to UE 1530 using an OTT connection 1550, in which wireless connection 1570 forms the last segment. More precisely, the teachings of these embodiments may improve the throughput and reduce scheduler contention within the access network, and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring an OTT connection (e.g., connecting a UE client to an Internet media server) formed between traffic shaping node 1510 and UE 1530, in response to variations in the measurement results. The measurement procedure and/or the network functionality for reconfiguring the OTT connection may be implemented in software 1511 (e.g., traffic shaping application 1512) and hardware 1515 of traffic shaping node 1510. In embodiments, sensors (not shown) may be deployed in or in association with communication devices through which the OTT connection passes; the sensors may participate in the measurement procedure by supplying values of the monitored quantities exemplified above, or supplying values of other physical quantities from which software 1511 may compute or estimate the monitored quantities. The reconfiguring of the OTT connection may include message format, retransmission settings, preferred routing etc.; the reconfiguring need not affect base station 1520, and it may be unknown or imperceptible to base station 1520. In certain embodiments, measurements may involve proprietary UE signaling facilitating traffic shaping node 1510's measurements of throughput, propagation times, latency and the like. The measurements may be implemented in that software 1511 causes messages to be transmitted, in particular empty or 'dummy' messages, using the OTT connection while it monitors propagation times, errors etc.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 16:
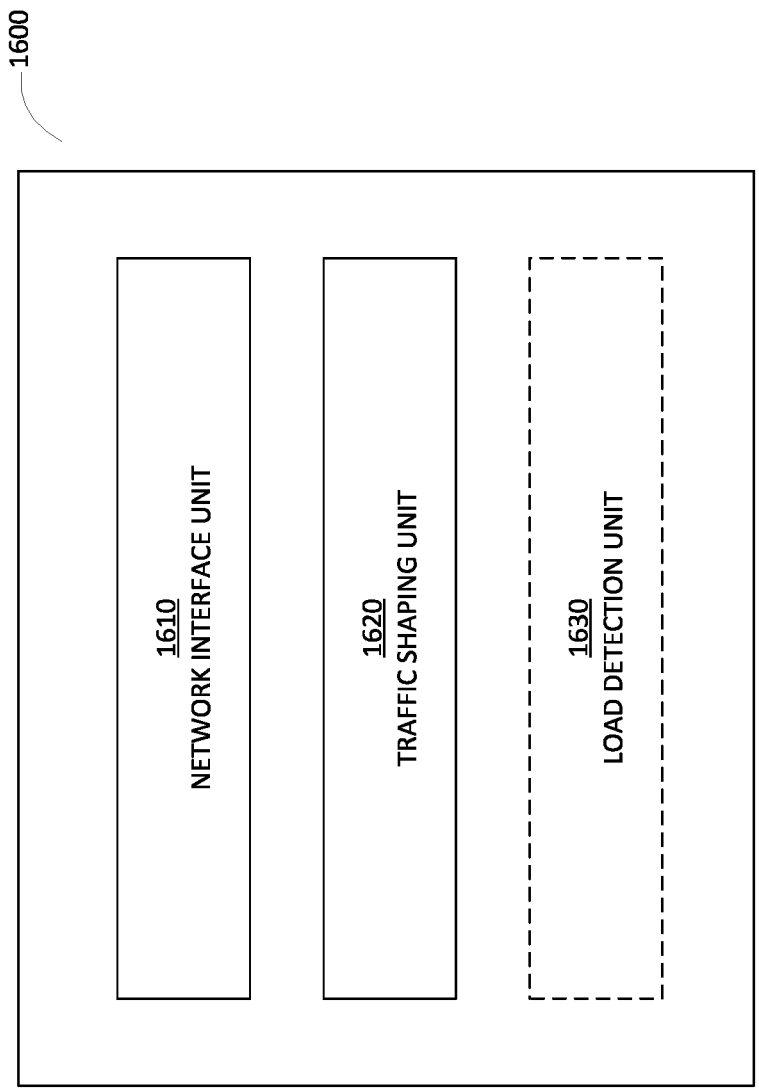
FIG. 16 illustrates a diagram of an exemplary apparatus in accordance with some embodiments.

FIG. 16 illustrates a schematic block diagram of an apparatus 1600 in a wireless network (for example, the wireless network shown in FIG. 14 and/or in FIG. 15). The apparatus may be implemented in a network node (e.g., block 1304 shown in FIG. 13, network node 1411 or network node 1430 shown in FIG. 14, network node 1510 or network node 1520 shown in FIG. 15). Apparatus 1600 is operable to carry out the example processes or methods described with reference to FIGS. 8, 9, 10, and 12 and possibly any other processes or methods disclosed herein. It is also to be understood that the method of FIGS. 8, 9, 10, and 12 are not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause network interface unit 1610, traffic shaping unit 1620, and optionally load detection unit 1630, and any other suitable units of apparatus 1600, to perform corresponding functions according one or more embodiments of the present disclosure.

As illustrated in FIG. 16, apparatus 1600 includes network interface unit 1610, traffic shaping unit 1620, and optionally load detection unit 1630. Network interface unit 1610 is configured to receive and/or transmit communications associated with a telecommunications network (e.g., to and from one or more base station nodes). Traffic shaping unit 1620 is configured to perform traffic shaping (e.g., adjusting one or more burst transmission parameters, enforcing a maximum bitrate, taking into account cell load to shape traffic). The load detection unit 1630 is configured to determine one or more of an interval load level and a cell load level of a base station node cell (e.g., based on RTT time of communications).

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

ABR Adaptive Bitrate
KPI Key Performance Indicator
MBR Maximum Bitrate
OTT Over The Top
RTT Round Trip Time
3GPP 3rd Generation Partnership Project
5G 5th Generation
DL Downlink
eNB E-UTRAN NodeB
E-UTRA Evolved UTRA
E-UTRAN Evolved UTRAN
gNB Base station in NR
GSM Global System for Mobile communication
LTE Long-Term Evolution
NR New Radio
OSS Operations Support System
O&M Operation and Maintenance
PGW Packet Gateway
RAN Radio Access Network
RAT Radio Access Technology
RLC Radio Link Control
TTI Transmission Time Interval
UE User Equipment Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A computer-implemented method for shaping video data traffic in a packet switched communications transport network, comprising:
    determining, based on round trip time (RTT) of communication between a traffic shaping node and a base station node, a cell load level associated with the base station node that is representative of a data traffic load of a cell of the base station node;
    setting, based at least on the determined cell load level associated with the base station, one or more burst transmission parameters for video data transmitted by the traffic shaping node to the base station node; and
    transmitting video data to the base station node using the set one or more burst transmission parameters, transmitting video data occurring in one or more burst transmissions that each include a plurality of packets that include video data.

2. The method of claim 1, wherein setting the one or more burst transmission parameters comprises setting one or more of:
    a total amount of data included in the plurality of packets of each burst transmission; and
    an interval of time between burst transmissions of the one or more burst transmissions.

3. The method of claim 2, further comprising:
    determining, based at least in part on the cell load level, a maximum bitrate for video data transmitted by the traffic shaping node to the base station node; and
    wherein setting the one or more transmission parameters comprises:
        setting, based at least in part on the determined maximum bitrate, the total amount of data included in the plurality of packets in each burst transmission; and
        setting, based at least in part on the determined maximum bitrate, the interval of time between burst transmissions of the one or more burst transmissions.

4. The method of claim 1, wherein determining the cell load level associated with the base station node comprises:
    determining a plurality of RTTs of a plurality of communications between the traffic shaping node and the base station node from a plurality of intervals of time;
    determining a plurality of interval load levels that includes respective interval load levels for each interval of time of the plurality of intervals of time based on RTTs of the plurality of RTTs;
    in accordance with a determination that at least a first number of interval load levels of the plurality of interval load levels match first time trend criteria, setting the cell load level to be a minimum interval load level of the first number of interval load levels; and
    in accordance with a determination that at least a second number of interval load levels of the plurality of interval load levels match second time trend criteria different from the first time trend criteria, setting the cell load level to be a maximum interval load level of the second number of interval load levels.

5. The method of claim 4, wherein determining the plurality of interval load levels comprises, for each respective interval of time of the plurality of intervals of time:
    determining a plurality of RTTs of a plurality of communications between the traffic shaping node and the base station node from the respective interval of time;
    determining, based at least in part of the plurality of RTTs from the respective interval of time, that one or more interval load criteria is met for the respective interval of time;
    setting the respective interval load level of the respective interval of time to be a load level of a plurality of interval load levels, wherein the load level is selected from the plurality of interval load levels based at least in part on the one or more interval load criteria that is met for the respective interval of time.

6. The method of claim 5, wherein determining that one or more interval load criteria is met for the respective interval of time and setting the respective interval load level comprise:
    determining a first proportion of RTTs of the plurality of RTTs from the respective interval of time that have the lowest RTT values of the plurality of RTTs from the respective interval of time;
    in accordance with a determination that an upper bound RTT value of the first proportion of RTTs is less than a first RTT threshold, setting the respective interval load level of the respective interval of time to be a first load level of the plurality of interval load levels; and in accordance with a determination that the upper bound RTT value of the first proportion of RTTs is equal to or larger than the first RTT threshold:

forgoing setting the respective interval load level of the respective interval of time to be the first load level of the plurality of interval load levels; and setting the respective interval load level of the respective interval of time to be an interval load level of the plurality of interval load levels different from the first interval load level of the plurality of interval load levels.

7. The method of claim 6, wherein setting the respective interval load level of the respective interval of time to be an interval load level different from the first interval load level comprises:

in accordance with a determination that the upper bound RTT value of the first proportion is less than a second RTT threshold, setting the respective interval load level of the respective interval of time to be a second load level of the plurality of interval load levels, wherein the second load level is different from the first load level, and wherein the second RTT threshold is larger than the first RTT threshold; and in accordance with a determination that the upper bound RTT value of the first proportion is equal to or larger than the second RTT threshold:

forgoing setting the respective interval load level to be the first load level;

forgoing setting the respective interval load level to be the second load level; and setting the respective interval load level to be an interval load level of the plurality of interval load levels different from the first load level and different from the second load level.

8. The method of claim 5, wherein determining that one or more interval load criteria is met for the respective interval of time and setting the respective interval load level comprise:

determining a second proportion of RTTs of the plurality of RTTs from the respective interval of time that are less than or equal to a third RTT threshold;

in accordance with a determination that the second proportion of RTTs is larger than a first proportion threshold, setting a respective interval load level of the respective interval to be a third load level of the plurality of interval load levels; and in accordance with a determination that the second proportion of RTTs is less than or equal to the first proportion threshold:

forgoing setting the respective interval load level to be the third load level of the plurality of interval load levels; and setting the respective interval load level to be a load level of the plurality of interval load levels different from the third interval load level of the plurality of interval load levels.

9. The method of claim 8, wherein setting the respective interval load level to be an interval load level different from the third interval load level comprises:

determining a third proportion of RTTs of the plurality of RTTs from the respective interval of time that are less than or equal to a fourth RTT threshold, wherein the fourth RTT threshold is larger than the third RTT threshold;

in accordance with a determination that the third proportion of RTTs is larger than a second proportion threshold, setting the respective interval load level of the respective interval to be a fourth load level of the plurality of interval load levels; and in accordance with a determination that the third proportion of RTTs is less than or equal to the second proportion threshold:

forgoing setting the respective interval load level to be the third load level;

forgoing setting the respective interval load level to be the fourth load level; and setting the respective interval load level to be a load level of the plurality of interval load levels different from the third load level and different from the fourth load level.

10. The method of claim 4, wherein the first time trend criteria and the second time trend criteria each include a different one of the following criteria:

each of the respective number of interval load levels of the plurality of interval load levels is less than a current value of the cell load level; and each of the respective number of interval load levels of the plurality of interval load levels is greater than a current value of the cell load level.

11. The method of claim 1, wherein round trip time is an amount of time between a first time and a second time, wherein the first time corresponds to when the traffic shaping node transmits a data packet toward the base station node, and wherein the second time corresponds to when the traffic shaping node receives a corresponding acknowledgement from the base station node.

12. The method of claim 1, wherein determining the cell load level associated with the base station node comprises acquiring the cell load level via communication from a node, other than the traffic shaping node, responsible for one or more of measuring and reporting radio access network (RAN) user-plane congestion.

13. A traffic shaping node device for shaping video data traffic in a packet switched communications transport network, said device comprising one or more processor and memory, said memory containing instructions executable by said one or more processors, said instructions including instructions for:

determining, based on round trip time (RTT) of communication between the traffic shaping node and a base station node, a cell load level associated with the base station node that is representative of a data traffic load of a cell of the base station node;

setting, based at least on the determined cell load level associated with the base station, one or more burst transmission parameters for video data transmitted by the traffic shaping node device to the base station node; and transmitting video data to the base station node using the set one or more burst transmission parameters, transmitting video data occurring in one or more burst transmissions that each include a plurality of packets that include video data.

14. The device of claim 13, wherein setting the one or more burst transmission parameters comprises setting one or more of:

a total amount of data included in the plurality of packets of each burst transmission; and an interval of time between burst transmissions of the one or more burst transmissions.

15. The device of claim 14, further comprising:
  determining, based at least in part on the cell load level, a maximum bitrate for video data transmitted by the traffic shaping node device to the base station node; and
  wherein setting the one or more transmission parameters comprises:
    setting, based at least in part on the determined maximum bitrate, the total amount of data included in the plurality of packets in each burst transmission; and
    setting, based at least in part on the determined maximum bitrate, the interval of time between burst transmissions of the one or more burst transmissions.

16. The device of claim 15, wherein determining the cell load level associated with the base station node comprises:
  determining a plurality of RTTs of a plurality of communications between the traffic shaping node device and the base station node from a plurality of intervals of time;
  determining a plurality of interval load levels that includes respective interval load levels for each interval of time of the plurality of intervals of time based on RTTs of the plurality of RTTs;
  in accordance with a determination that at least a first number of interval load levels of the plurality of interval load levels match first time trend criteria, setting the cell load level to be a minimum interval load level of the first number of interval load levels; and
  in accordance with a determination that at least a second number of interval load levels of the plurality of interval load levels match second time trend criteria different from the first time trend criteria, setting the cell load level to be a maximum interval load level of the second number of interval load levels.

17. The device of claim 16, wherein determining the plurality of interval load levels comprises, for each respective interval of time of the plurality of intervals of time:
  determining a plurality of RTTs of a plurality of communications between the traffic shaping node device and the base station node from the respective interval of time;
  determining, based at least in part of the plurality of RTTs from the respective interval of time, that one or more interval load criteria is met for the respective interval of time; and
  setting the respective interval load level of the respective interval of time to be a load level of a plurality of interval load levels, wherein the load level is selected from the plurality of interval load levels based at least in part on the one or more interval load criteria that is met for the respective interval of time.

18. The device of claim 17, wherein determining that one or more interval load criteria is met for the respective interval of time and setting the respective interval load level comprise:
  determining a first proportion of RTTs of the plurality of RTTs from the respective interval of time that have the lowest RTT values of the plurality of RTTs from the respective interval of time;
  in accordance with a determination that an upper bound RTT value of the first proportion of RTTs is less than a first RTT threshold, setting the respective interval load level of the respective interval of time to be a first load level of the plurality of interval load levels; and
  in accordance with a determination that the upper bound RTT value of the first proportion of RTTs is equal to or larger than the first RTT threshold:
    forgoing setting the respective interval load level of the respective interval of time to be the first load level of the plurality of interval load levels; and
    setting the respective interval load level of the respective interval of time to be an interval load level of the plurality of interval load levels different from the first interval load level of the plurality of interval load levels.

19. The device of claim 18, wherein setting the respective interval load level of the respective interval of time to be an interval load level different from the first interval load level comprises:
  in accordance with a determination that the upper bound RTT value of the first proportion is less than a second RTT threshold, setting the respective interval load level of the respective interval of time to be a second load level of the plurality of interval load levels, wherein the second load level is different from the first load level, and wherein the second RTT threshold is larger than the first RTT threshold; and
  in accordance with a determination that the upper bound RTT value of the first proportion is equal to or larger than the second RTT threshold:
    forgoing setting the respective interval load level to be the first load level;
    forgoing setting the respective interval load level to be the second load level; and
    setting the respective interval load level to be an interval load level of the plurality of interval load levels different from the first load level and different from the second load level.

20. The device of claim 17, wherein determining that one or more interval load criteria is met for the respective interval of time and setting the respective interval load level comprise:
  determining a second proportion of RTTs of the plurality of RTTs from the respective interval of time that are less than or equal to a third RTT threshold;
  in accordance with a determination that the second proportion of RTTs is larger than a first proportion threshold, setting a respective interval load level of the respective interval to be a third load level of the plurality of interval load levels; and
  in accordance with a determination that the second proportion of RTTs is less than or equal to the first proportion threshold:
    forgoing setting the respective interval load level to be the third load level of the plurality of interval load levels; and
    setting the respective interval load level to be a load level of the plurality of interval load levels different from the third interval load level of the plurality of interval load levels.

21. The device of claim 20, wherein setting the respective interval load level to be an interval load level different from the third interval load level comprises:
  determining a third proportion of RTTs of the plurality of RTTs from the respective interval of time that are less than or equal to a fourth RTT threshold, wherein the fourth RTT threshold is larger than the third RTT threshold;
  in accordance with a determination that the third proportion of RTTs is larger than a second proportion threshold, setting the respective interval load level of the respective interval to be a fourth load level of the plurality of interval load levels; and in accordance with a determination that the third proportion of RTTs is less than or equal to the second proportion threshold:

forgoing setting the respective interval load level to be the third load level;

forgoing setting the respective interval load level to be the fourth load level; and setting the respective interval load level to be a load level of the plurality of interval load levels different from the third load level and different from the fourth load level.

22. A computer-readable storage medium storing instructions for shaping video data traffic in a packet switched communications transport network, the instructions being executable by a device having one or more processors and memory, the instructions including instructions for:

determining, based on round trip time (RTT) of communication between a traffic shaping node and a base station node, a cell load level associated with the base station node that is representative of a data traffic load of a cell of the base station node;

setting, based at least on the determined cell load level associated with the base station, one or more burst transmission parameters for video data transmitted by the traffic shaping node to the base station node; and transmitting video data to the base station node using the set one or more burst transmission parameters, transmitting video data occurring in one or more burst transmissions that each include a plurality of packets that include video data.

23. The computer-readable medium of claim 22, wherein setting the one or more burst transmission parameters comprises setting one or more of:

a total amount of data included in the plurality of packets of each burst transmission; and an interval of time between burst transmissions of the one or more burst transmissions.

* * * * *